US012567405B1

(12) United States Patent
Kumar et al.

(10) Patent No.: US 12,567,405 B1
(45) Date of Patent: Mar. 3, 2026

(54) NATURAL LANGUAGE PROMPT GENERATION

(71) Applicant: Amazon Technologies, Inc., Seattle, WA (US)

(72) Inventors: Anjishnu Kumar, Seattle, WA (US); Sudipta Kar, Seattle, WA (US); Zeynabalsadat Raeesy, Seattle, WA (US); Jaewon Choi, Vancouver (CA); Omar Zia Khan, Clyde Hill, WA (US); Anand Ramachandran, Campbell, CA (US); Jeffrey Hudson Lierman, Kirkland, WA (US); Abhinav Sethy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 562 days.

(21) Appl. No.: 18/107,666

(22) Filed: Feb. 9, 2023

(51) Int. Cl.
    *G10L 15/26*     (2006.01)
    *G06F 40/295*     (2020.01)
    *G10L 15/18*     (2013.01)
    *G10L 15/22*     (2006.01)
    *G10L 15/30*     (2013.01)

(52) U.S. Cl.
    CPC ........ *G10L 15/1815* (2013.01); *G06F 40/295* (2020.01); *G10L 15/22* (2013.01); *G10L 15/30* (2013.01)

(58) Field of Classification Search
    CPC ..... G10L 15/1815; G10L 15/06; G10L 15/18; G10L 2015/227; G10L 15/063; G10L 15/22; G10L 15/30; G10L 15/26; G06F 40/295

USPC .......................................................... 704/235
See application file for complete search history.

(56) References Cited

U.S. PATENT DOCUMENTS

| | | | |
|---|---|---|---|
| 9,805,718 B2 * | 10/2017 | Ayan ....................... | G10L 15/22 |
| 11,315,552 B1 | 4/2022 | George et al. | |
| 11,544,303 B1 | 1/2023 | George et al. | |

OTHER PUBLICATIONS

Pooja Rao S B, et al., "Automatic Follow-up Question Generation for Asynchronous Interviews." Proceedings of the Workshop on Intelligent Information Processing and Natural Language Generation, Santiago de Compostela, Spain Association for Computational Lingustics, pp. 10-20, 2020.

(Continued)

*Primary Examiner* — Md S Elahee
(74) *Attorney, Agent, or Firm* — Pierce Atwood LLP

(57) ABSTRACT

Techniques for determining a follow-up natural language prompt, to continue a user-system dialog, are described. The system determines ASR output data representing a user input and/or a system-generated responsive thereto. The system determines one or more entities represented in the ASR output data and/or the system-generated response, and identifies one or more natural language prompts associated with the one or more entities in storage. The system filters out prompts classified as likely to result in an unsatisfactory user experience, using dialog history data including a previous user input(s) and/or a previous system-generated response(s). The system determines context(s) associated with the instant user and/or device, and uses this context(s), the ASR output data, and/or the system-generated response to determine which of the follow-up prompts is to be presented to the user.

19 Claims, 13 Drawing Sheets

(56)             References Cited

OTHER PUBLICATIONS

Choi, Eunsol, et al. "QuAC: Question answering in context." arXiv preprint arXiv:1808.07036 (2018).

Devlin, Jacob, et al. "Bert: Pre-training of deep bidirectional transformers for language understanding." arXiv preprint arXiv:1810.04805 (2018).

Ge, Yubin, et al. "What should I Ask: A Knowledge-driven Approach for Follow-up Questions Generation in Conversational Surveys." arXiv preprint arXiv:2205.10977 (2022).

Elgohary, et al. "Can You Unpack That? Learning to Rewrite Questions-in-Context", Empirical Methods in Natural Language Processing, 2019.

Kundu, Souvik, Qian Lin, and Hwee Tou Ng. "Learning to identify follow-up questions in conversational question answering." Proceedings of the 58th Annual Meeting of the Association for Computational Linguistics. 2020.

Lewis, Mike, et al. "Bart: Denoising sequence-to-sequence pre-training for natural language generation, translation, and comprehension." arXiv preprint arXiv:1910.13461 (2019).

Liu, Yinhan, et al. "Roberta: A robustly optimized bert pretraining approach." arXiv preprint arXiv:1907.11692 (2019).

Pennington, Jeffrey, Richard Socher, and Christopher D. Manning. "Glove: Global vectors for word representation." Proceedings of the 2014 conference on empirical methods in natural language processing (EMNLP). 2014.

Qu, Chen, et al. "Open-retrieval conversational question answering." Proceedings of the 43rd International ACM SIGIR conference on research and development in Information Retrieval. 2020.

Raffel, Colin, et al. "Exploring the limits of transfer learning with a unified text-to-text transformer." The Journal of Machine Learning Research 21.1 (2020): 5485-5551.

Reimers, Nils, and Iryna Gurevych. "Sentence-bert: Sentence embeddings using siamese bert-networks." arXiv preprint arXiv:1908.10084 (2019).

Su, Ming-Hsiang, et al. "Follow-up Question Generation Using Pattern-based Seq2seq with a Small Corpus for Interview Coaching" Interspeech. 2018.

* cited by examiner

FIG. 2

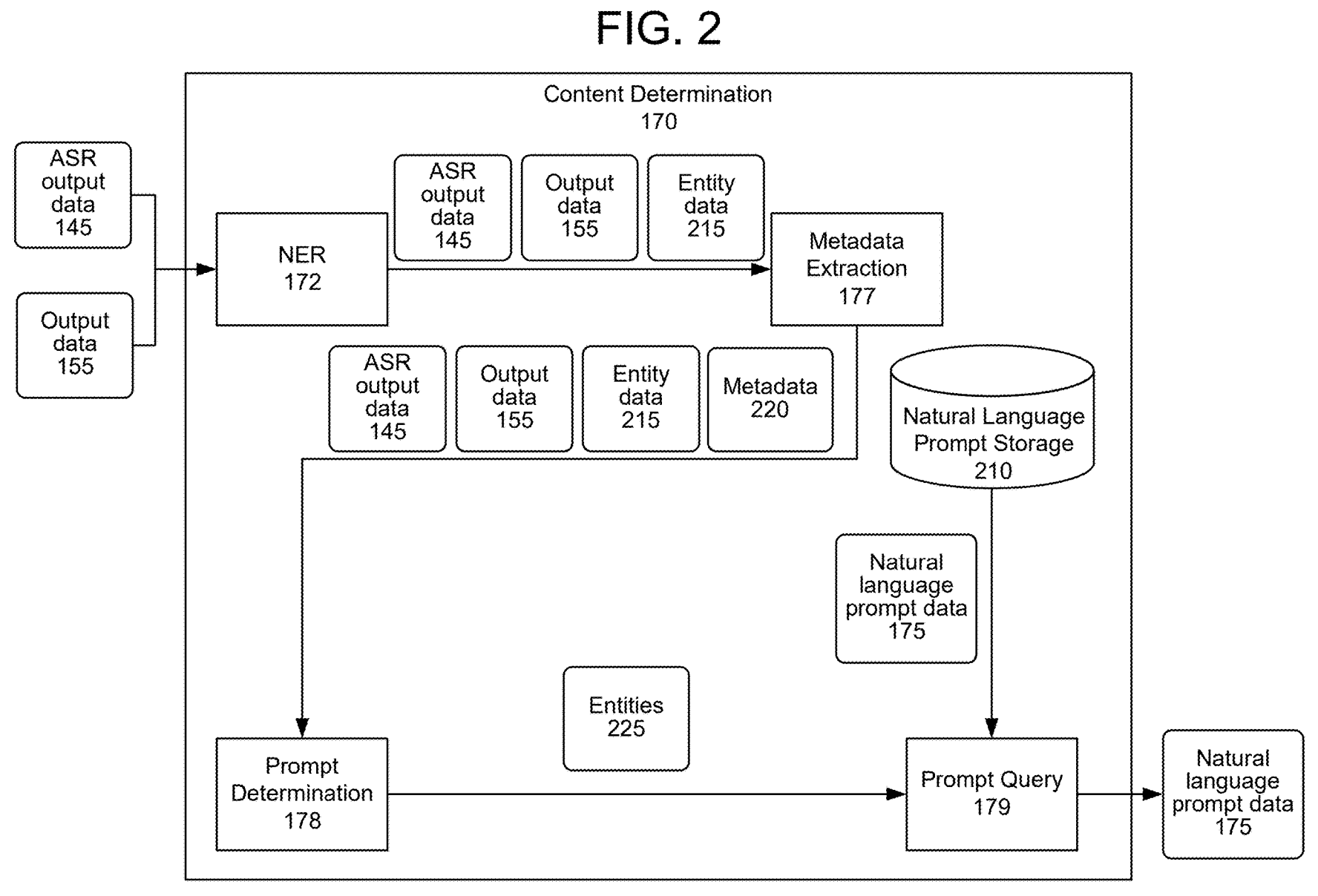

Content Determination 170

ASR output data 145

Output data 155

NER 172

ASR output data 145

Output data 155

Entity data 215

Entity data 215

Metadata 220

Metadata Extraction 177

Natural Language Prompt Storage 210

Natural language prompt data 175

Prompt Query 179

Natural language prompt data 175

Entities 225

Prompt Determination 178

Figure 5:
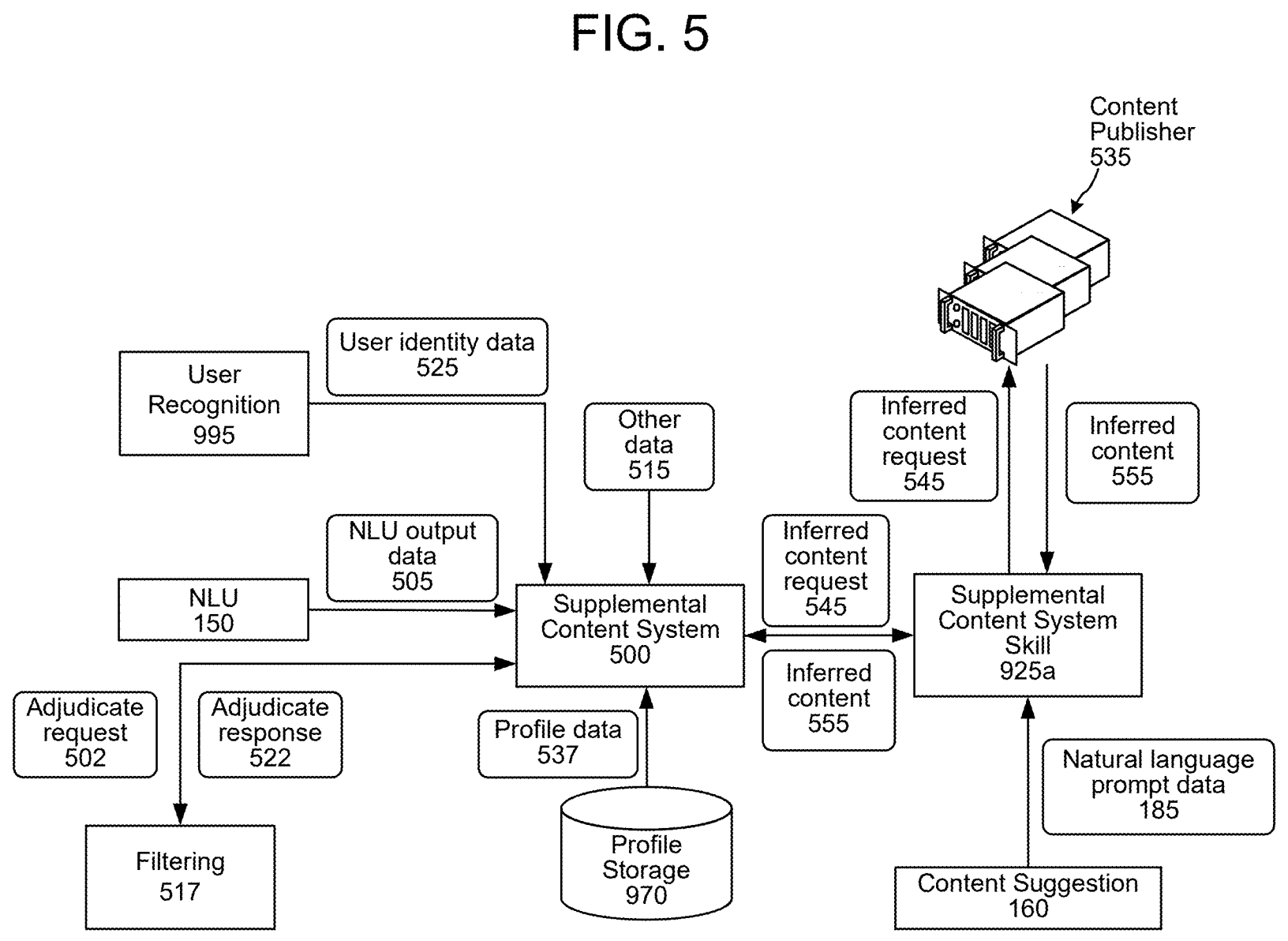

Content Publisher 535

Inferred content 555

Supplemental Content System Skill 925a

Natural language prompt data 185

Content Suggestion 160

Inferred content request 545

Inferred content request 545

Inferred content 555

Other data 515

Supplemental Content System 500

Profile Storage 970

Profile data 537

User identity data 525

NLU output data 505

User Recognition 995

NLU 150

Adjudicate response 522

Adjudicate request 502

Filtering 517

FIG. 6

Notification System
600

| | | | |
|---|---|---|---|
| Topic Management 605 | Subscription 610 | Delivery Preference 615 | VUI/GUI Subscription and Preference Management 620 |
| Delivery Management 625 | Content Rendering 630 | Event Bus 635 | Expiry Tracking 640 |

FIG. 11

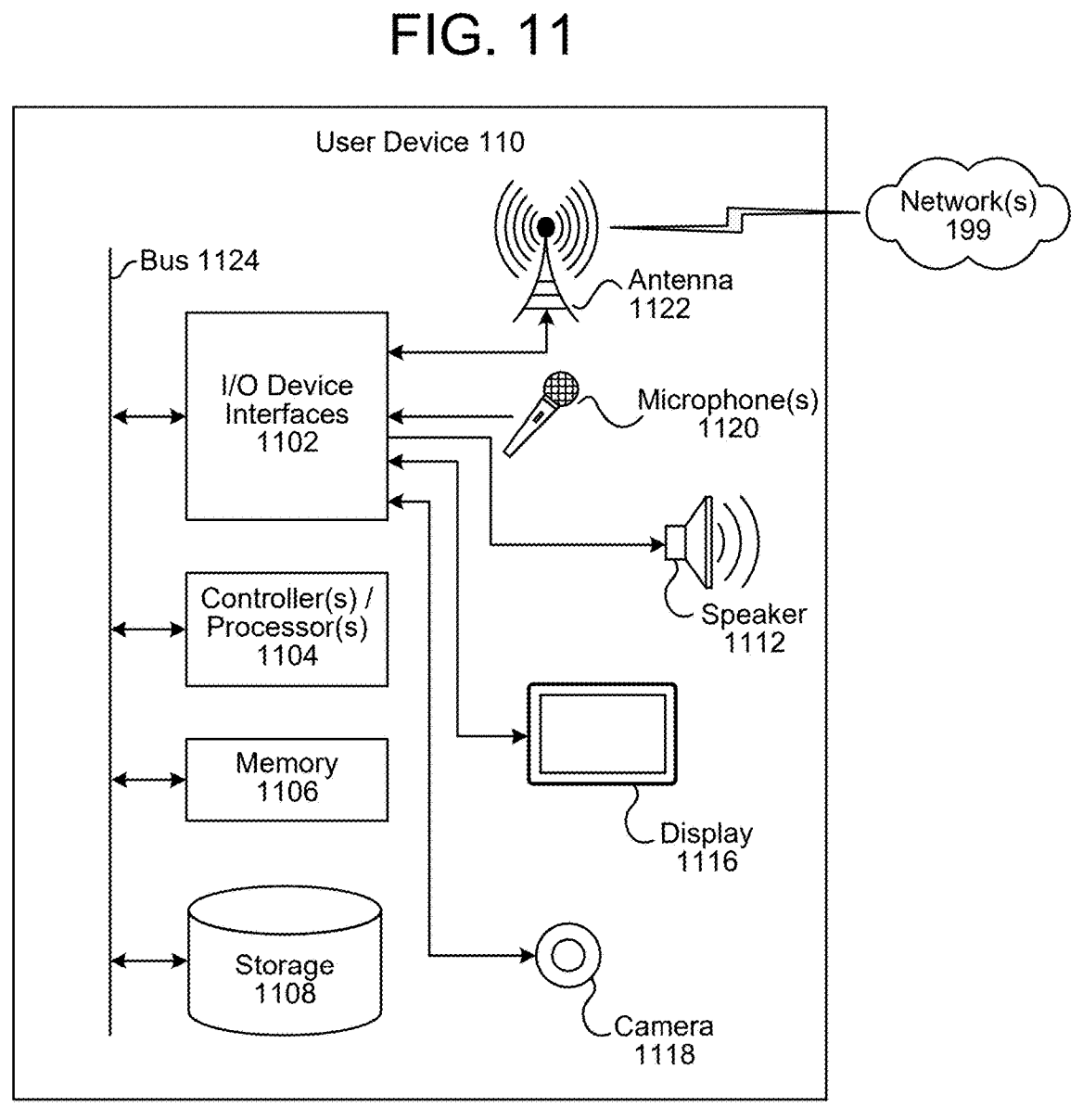

User Device 110

Network(s) 199

Antenna 1122

Microphone(s) 1120

Speaker 1112

Display 1116

Camera 1118

Bus 1124

I/O Device Interfaces 1102

Controller(s) / Processor(s) 1104

Memory 1106

Storage 1108

FIG. 12

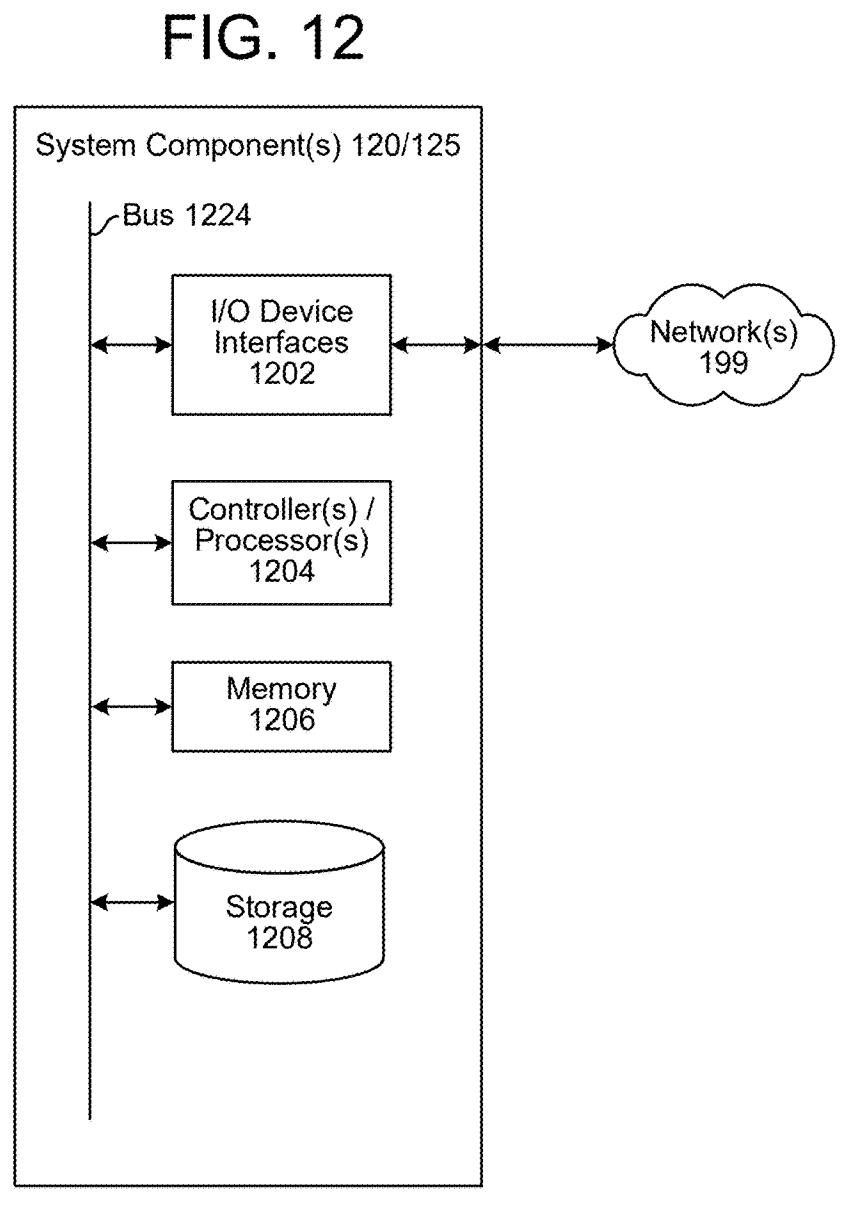

Network(s) 199

System Component(s) 120/125

Bus 1224

I/O Device Interfaces 1202

Controller(s) / Processor(s) 1204

Memory 1206

Storage 1208

NATURAL LANGUAGE PROMPT GENERATION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram illustrating example processing performed by a content determination component, according to embodiments of the present disclosure.

FIG. 3 is a conceptual diagram illustrating example offline processing that may be performed to generate and store natural language prompts, according to embodiments of the present disclosure.

FIG. 5 is a conceptual diagram illustrating how a supplemental content system may process data, according to embodiments of the present disclosure.

FIG. 6 is a conceptual diagram illustrating how a notification system may process data, according to embodiments of the present disclosure.

FIG. 11 is a block diagram conceptually illustrating example components of a device, according to embodiments of the present disclosure.

FIG. 12 is a block diagram conceptually illustrating example components of a system, according to embodiments of the present disclosure.

DETAILED DESCRIPTION

Figure 1:
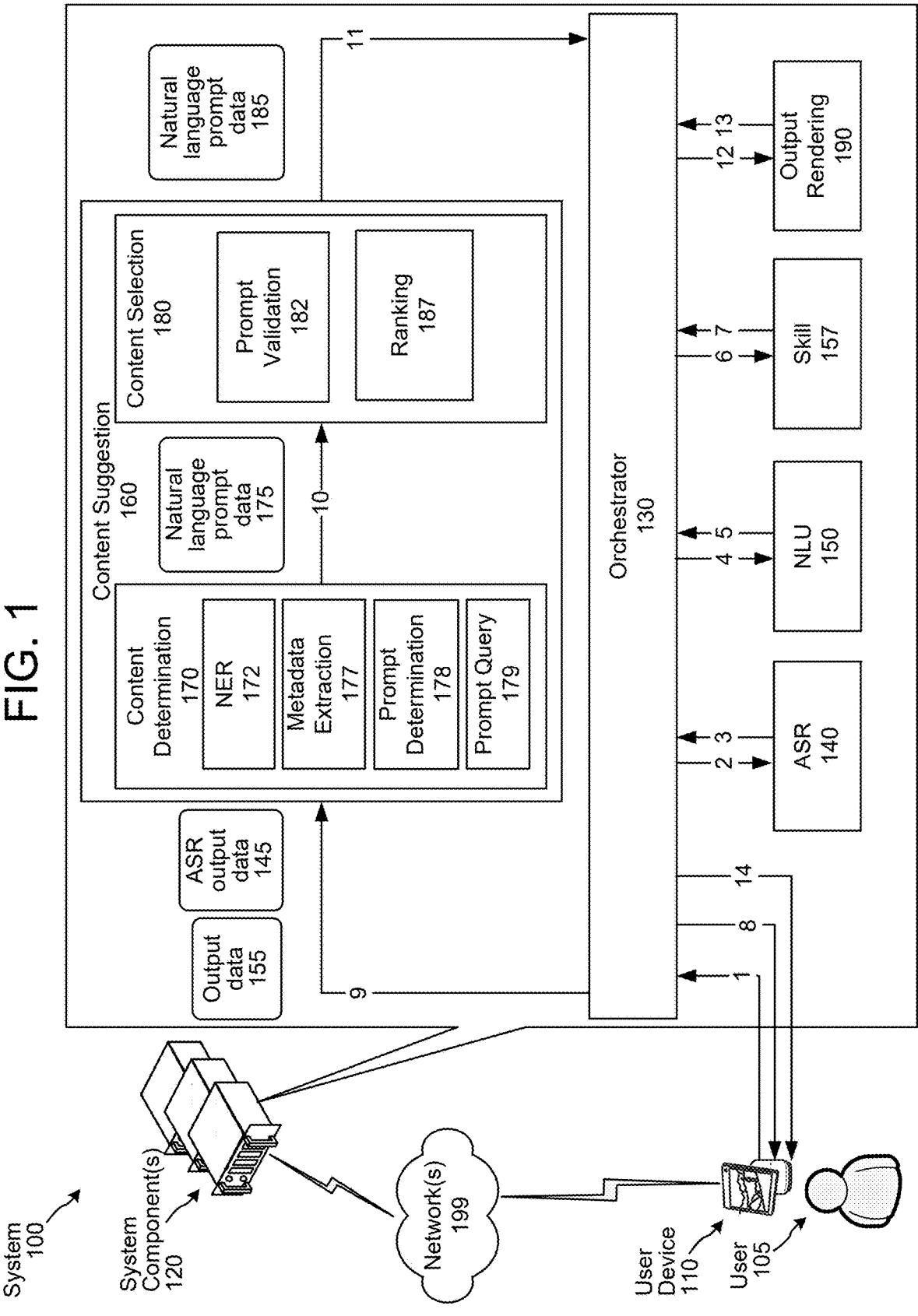
FIG. 1 is a conceptual diagram illustrating a system for generating a natural language prompt, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

A system may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

In some instances, the system may be configured to determine and output a follow-up natural language prompt to continue a user-system dialog. For example, in response to the natural language user input "play [song name] by [artist name]" and the corresponding system-generated response "outputting [song name] by [artist name]," the system may determine to further output an audio (and/or visual) prompt corresponding to "Would you like to know more about [artist name]?" For further example, in response to the natural language user input "book me a hotel in [destination] for [date/time]" and the corresponding system-generated response "I have booked you a hotel in [destination] for [date/time]," the system may determine to further output an audio (and/or visual) prompt corresponding to "Would you like to know more about [destination]?"

As used herein, a "dialog" may refer to data transmissions (such as relating to multiple user inputs and system outputs) between the system and a user (e.g., through one or more user devices) that all relate to a single "conversation" between the system and the user. Thus, the data transmissions of a dialog may be associated with a same dialog identifier, which may be used by components of the system to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system to request a food delivery in a spoken utterance and the system may respond by displaying images of food available for order and the user may then speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The present disclosure provides, among other things, techniques for determining when it may be beneficial to output a follow-up prompt to continue or otherwise enhance a user-system dialog, as well as techniques for determining which follow-up prompt to output.

The system may receive a user input, process the user input to determine an ASR output including a transcript of the user input, and process the ASR output to determine an NLU output including at least an intent corresponding to the user input. Thereafter, the system may determine a system-generated response to the user input, and may send the system-generated response to a user device for output.

In addition to or separate from the foregoing, the system may perform named entity recognition (NER) on the ASR output and/or the system-generated response to determine one or more entities included in the ASR output and/or system-generated response. The system may process the ASR output, the system-generated response, and/or the entities to determine whether a follow-up prompt is appropriate to continue the user-system dialog. If not, the system ceases processing with respect to the ASR output and/or the system-generated response. If so, the system may determine, in storage, one or more pre-generated natural language prompts associated with at least one of the one or more entities determined from performing the NER processing on the ASR output and/or the system-generated response.

The system may determine a dialog history including one or more previous user inputs and/or one or more previous system-generated responses of the current dialog between the user and the system. The system may perform classification processing using one or more of, e.g., the ASR output, the system-generated response to the instant user input, the natural language prompt(s), or the dialog history to determine whether any of the natural language prompts, identified above, corresponds to one or more categories of natural language prompts that will result in an error (i.e., is unlikely to continue the current user-system dialog). For example, the system may determine a natural language prompt will result in an error if the natural language prompt is a rewrite of the ASR output and/or the system-generated response, the natural language prompt includes an entity that is not represented in the ASR output and/or the system-generated response, or the natural language prompt includes an entity similar but not identical to an entity represented in the ASR output and/or the system-generated response.

The system may determine a subset of the natural language prompts that are unlikely to result in an error (e.g., are likely to continue the current user-system dialog, provide relevant information/offer, or otherwise be viewed favorably by the user). The system may determine a context associated with the user and/or the device (e.g., time of day, weather, device profile information (e.g., device type, device ID, device context, etc.), user profile information (e.g., age, gender, shopping history, previous request intents, etc.), frequency of interaction with previously output natural language prompts, likelihood of interacting with future output natural language prompts, etc.)), and processes the ASR output, the system-generated response, the subset of the natural language prompts, the dialog history, and the context to determine a ranked list of natural language prompts based on how likely the user is to interact with the natural language prompts. Using the ranked list, the system may determine and output a particular natural language prompt as audio (e.g., synthesized speech) and/or image or video.

A system of the present disclosure may receive, by a device, input audio corresponding to a first spoken user input of a dialog. The system may perform ASR processing using the input audio to generate a first ASR output including a transcript of the first spoken user input. The system may perform NLU processing using the first ASR output to generate an NLU output including an intent corresponding to the first spoken user input. The system may generate, using the NLU output, a first output responsive to the first spoken user input. The system may cause the device to present the first output. The system may perform named entity recognition (NER) processing to determine at least an entity represented in the at least one of the first ASR output and the first output. The system may identify a first plurality of natural language prompts associated with the entity, where the first plurality of natural language prompts include a first natural language prompt, a second natural language prompt, and a second third natural language prompt. The system may determine a dialog history including a second ASR output including a previous transcript of a previous spoken user input of the dialog. The system may process the first plurality of natural language prompts, the first ASR output, the first output, and the dialog history to determine that output of the first natural language prompt will likely result in an unsatisfactory user experience. Based on determining that output of the first natural language prompt will likely result in the unsatisfactory user experience, the system may determine a second plurality of natural language prompts including the second natural language prompt and the third natural language prompt without including the first natural language prompt. Using a trained machine learning (ML) component, the system may process the second plurality of natural language prompts, the first ASR output, the first output, and the dialog history to determine a first likelihood that output of the second natural language prompt will result in receipt of a subsequent user input associated with the second natural language prompt, and a second likelihood that output of the third natural language prompt will result in receipt of a subsequent user input associated with the third natural language prompt. Based on the first likelihood and the second likelihood, the system may generate a second output corresponding to the second natural language prompt instead of the third natural language prompt. The system may cause the device to present the second output.

In some embodiments, using a second trained ML component configured to determine whether a current turn of the dialog is appropriate for output of a natural language prompt, the system may process the first ASR output, the first output, and the entity to determine the first spoken user input corresponds to a category. The system may determine that the category indicates that the current turn of the dialog is appropriate for output of a natural language prompt. Based on the category, the system may identify the first plurality of natural language prompts associated with the first entity.

In some embodiments, determining that output of the first natural language prompt will likely result in the unsatisfactory user experience comprises processing, using a second trained ML component, the first plurality of natural language prompts, the first ASR output, the first output, and the dialog history to determine a first score associated with the first natural language prompt, determining that the first score fails to satisfy a condition, and based on the first score failing to satisfy the condition, determining that output of the first natural language prompt will likely result in the unsatisfactory user experience. In such embodiments, the system may process, using the second trained ML component, the second natural language prompt, the first ASR output, the first output, and the dialog history to determine a second score associated with the second natural language prompt. The system may determine that the second score satisfies the condition. Based on the second score satisfying the condition, the system may determine that output of the second natural language prompt will likely result in the receipt of the subsequent user input requesting information related to the second natural language prompt. The system may process, using the second trained ML component, the third natural language prompt, the first ASR output, the first output, and the dialog history to determine a third score associated with the third natural language prompt. The system may determine that the third score satisfies the condition. Based on determining that the second score and the third score satisfy the condition, the system may determine which of the second natural language prompt and the third natural language prompt is to be output.

In some embodiments, the system may determine first natural language data. The system may generate, using first natural language data, a fourth natural language prompt. The system may determine second natural language data. The system may generate, using the second natural language data, a fifth natural language prompt. The system may determine a cluster of natural language prompts including the fourth natural language prompt and the fifth natural language prompt, where the cluster of natural language prompts represents that the fourth natural language prompt is semantically associated with the fifth natural language prompt. Based on the fourth natural language prompt and the fifth natural language prompt being included in the cluster of natural language prompts, the system may determine the first plurality of natural language prompts to include one of the fourth natural language prompt and the fifth natural language prompt.

A system of the present disclosure may receive first natural language input data corresponding to a first natural language user input. The system may determine a first output that is responsive to the first natural language user input. The system may determine at least one entity represented in at least one of the first natural language input data and the first output. The system may identify a first plurality of natural language output associated with the first entity, where the first plurality of natural language output includes first natural language output and second natural language output. The system may determine a history including second natural language input data corresponding to a previous user input. The system may process the first plurality of natural language outputs, the first natural language input data, the first output, and the history to determine that output of the first natural language output data will likely result in an unsatisfactory user experience. Based on determining that output of the first natural language output will likely result in the unsatisfactory user experience, the system may determine a second plurality of natural language outputs including the second natural language output without including the first natural language output. Using a trained ML component, the system may process the second plurality of natural language outputs, the first natural language input data, the first output, and the history, to determine that output of the second natural language output will result in a satisfactory user experience. The system may cause the second natural language output to be presented.

In some embodiments, the first natural language input data is received as part of a dialog. In such embodiments, the system may process, using a second trained ML component configured to determine whether a current turn of the dialog is appropriate for output of a natural language output, the first natural language input data, the first output, and the first entity to determine the first natural language user input corresponds to a category. The system may determine that the category indicates that the current turn of dialog is appropriate for output of a natural language output. Based on category, the system may identify the first plurality of natural language prompts.

In some embodiments, the system may process, using a second trained ML component, the first natural language output, the first natural language input, the first output, and the history to determine that the first natural language output corresponds to a rephrasing of at least one of the first natural language input, the first output, and the history. The system may determine that output of the first natural language output will likely result in the unsatisfactory user experience based on determining that the first natural language output corresponds to the rephrasing.

In some embodiments, the system may determine third natural language input data. The system may generate, using the third natural language input data, a third natural language output. The system may determine fourth natural language input data. The system may generate, using the fourth natural language input data, a fourth natural language output. The system may determine a cluster of natural language outputs including the third natural language output and the fourth natural language output, where the cluster of natural language outputs represents that the third natural language output is semantically associated with the fourth natural language output. Based on the third natural language output and the fourth natural language output being included in the cluster of natural language outputs, the system may determine the plurality of natural language outputs to include one of the third natural language output and the fourth natural language output.

In some embodiments, the system may determine third natural language input data corresponding to a second natural language user input. The system may determine the second natural language user input has been received with at least a threshold frequency. Based on the second natural language user input being received with at least the threshold frequency, the system may generate a third natural language output corresponding to the second natural language user input.

In some embodiments, the system may determine the second natural language output will likely result in the satisfactory user experience using a second trained ML component. The system may determine a second history including a third natural language input corresponding to a second previous user input. The system may determine third output data corresponding to a third natural language output. The system may determine fourth output data corresponding to a fourth natural language prompt. The system may determine the second previous user input corresponds to the third output data. The system may determine the fourth output data is unassociated with the second history data. The system may generate an updated trained ML component based on the second trained ML component, the second previous user input corresponding to the third output, and the fourth output being unassociated with the second history.

In some embodiments, the system may identify a third natural language output associated with the first entity. The system may determine the third natural language output is semantically equivalent to the first natural language input data, where the trained ML component does not process with respect to the third natural language output based on determining that the third natural language output is semantically equivalent to the first natural language input data.

In some embodiments, the system may identify a third natural language output associated with the first entity. The system may determine that the third natural language output includes a second entity different from the first entity, the second entity unassociated with the first natural language input data, where the trained ML component does not process with respect to the third natural language output based on third natural language output including the second entity different from the first and the second entity being unassociated with the first natural language input data.

Teachings of the present disclosure provide, among other things, an improved user experience by presenting the user with a follow-up prompt that the user is likely to interested in interacting with, based on a current dialog between the user and the system.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for prompting a user to continue a user-system dialog. The system 100 may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components. With reference to FIG. 1, the system component(s) 120 may include an orchestrator component 130, an ASR component 140, a NLU component 150, a skill component 157, a content suggestion component 160, and an output rendering component 190. However, the present disclosure is not intended to be limited to such a configuration. In some embodiments, the user device 110 may include or otherwise be configured to perform the herein disclosed processing of one or more of the orchestrator component 130, the ASR component 140, the NLU component 150, the skill component 157, the content suggestion component 160, and the output rendering component 190. In some embodiments, the content suggestion component 160 may include a content determination component 170 and a content selection component 180. In some embodiments, the content determination component 170 may include a named entity recognition (NER) component 172, a metadata extraction component 177, a prompt determination component 178, and a prompt query component 179. In some embodiments, the content selection component 180 may include a prompt validation component 182 and a ranking component 187.

As illustrated in FIG. 1, the user device 110 may receive a user input, and send (at arrow 1) user input data corresponding thereto to the system component(s) 120. The user input may request performance of an action. For example, the user input may be "how old is [entity name]," "lock the front door," "book me a train ticket to [location]," "book me a ride to [location]," "play [song name] by [artist name]," "what is today's weather," or some other user input requesting performance of an action The user input data may include various types of data. For example, the user input data may include input audio data when the user input is a spoken natural language input. In the situation where the user input data includes input audio data, the input audio data may correspond to spoken natural language received by one or more microphones of or associated with the user device 110. For further example, the user input data may include input text (or tokenized) data when the user input is a typed natural language user input. In some embodiments, the user input data may include other types of data, such as data representing actuation of a physical button, data representing selection of a button displayed on a graphical user interface (GUI), image data of a gesture user input, etc.

The system component(s) 120 may receive the user input data at the orchestrator component 130. The orchestrator component 130 may be configured to facilitate processing performed by various components of the system component(s) 120. For example, the orchestrator component 130 may be configured to facilitate processing to understand a user input, as well as to perform an action responsive to the user input.

In the situation where the user input data is or includes input audio data, the orchestrator component may send (at arrow 2) the input audio data to the ASR component 140. In the situation where the user input data is or includes other types of data (e.g., data representing actuation of a physical button, data representing selection of a button displayed on a GUI, image data of a gesture user input, etc.), the system component(s) 120 may send the suer input data to one or more components configured to process the receive data to generate a text (or tokenized) representation of the data capable of being processed by the NLU component 150. For example, if the user input data represents selection of a GUI-displayed button corresponding to "I would like to know where [entity name] was born," then one or more components of the system component(s) 120 may process the user input data to generate a text (or tokenized) representation of "I would like to know where [entity name] was born." For further example, if the user input data is or includes image data of a user gesture corresponding to the user nodding its head in response to the output audio "would you like to hear your schedule for today," then a gesture detection component, of the system component(s) 120, may process the image data to generate a text (or tokenized) representation of "I would like to know my schedule for today."

In the situation where the user input data is or includes input audio data and the orchestrator component 130 send the input audio data to the ASR component at arrow 2, the ASR component 140 processes the input audio data and generates ASR output data 145 including a text or tokenized transcript of the spoken natural language input of input audio data. Processing of the ASR component 140 is described in further detail herein below in connection with FIG. 9. The ASR component 140 may send (at arrow 3) the ASR output data 145 to the orchestrator component 130, and the orchestrator may, in turn, send (at arrow 4) the ASR output data 145 to the NLU component 150.

In situations where the user input data is or includes data other than input audio data, and a component(s) of the system component(s) 120 processes to generate text or tokenized data representing the user input data, the orchestrator component 130 may send this text or tokenized data to the NLU component 150 at arrow 4. In situations where the user input data is or includes input text data or a typed natural language user input, the orchestrator component 130 may send the input text data to the NLU component 150 at arrow 4.

The NLU component 150 processes the ASR output data 145 (or other received text or tokenized data representing the user input) and generates NLU output data indicating at least an intent (e.g., including an intent indicator) representing the user input. Processing of the NLU component 150 is described in further detail herein below in connection with FIG. 9. The NLU component 150 may send (at arrow 5) the NLU output data to the orchestrator component 130.

The orchestrator component 130 may send (at arrow 6) the NLU output data to a skill component 157 to generate output data, responsive to the user input. The skill component 157 may process with respect to the NLU output data to generate output data, and may send (at arrow 7) the output data to the orchestrator component 130.

The output data may include image data for display by the user device 110, video data for display by the user device 110, and/or audio data (e.g., including synthesized speech) for output by the user device 110. Techniques for generating the output data using the skill component 157 are described in detail herein below with respect to FIG. 9.

Thereafter, the orchestrator component 130 may cause the output data to be sent (at arrow 8) to the user device 110 to be output to the user 105.

After or at least partially in parallel to the output data being generated or the output data being presented using the user device 110, the orchestrator component 130 may send (at arrow 9) the ASR output data 145 and/or the output data 155 to the content suggestion component 160. Within the content suggestion component 160, the ASR output data 145 and/or the output data 155 may be received by the content determination component 170, which processes the ASR output data 145 and/or the output data 155 to generate one or more natural language prompt data(s) 175 that may be used to facilitate continuance of the instant user-system dialog. Example processing of the content determination component 170 is illustrated in FIG. 2.

As shown in FIG. 2, the content determination component 170 may include the NER component 172, the metadata extraction component 177, the prompt determination component 178, the prompt query component 179, and a natural language prompt storage 210. In some embodiments, the natural language prompt storage 210 may be included elsewhere in the system component(s) 120, and the content determination component 170 may be in communication with the natural language prompt storage 210.

The NER component 172 may receive the ASR output data 145 and/or the output data 155, and process same to determine entity data 215 indicating one or more entities included in (i.e., represented in) the ASR output data 145 and/or the output data 155.

The NER component 172 may be configured to determine the entity data 215 using NER processing techniques. In some embodiments, the NER component 172 may include one or more domain-specific NER components, where each domain-specific NER component is configured to identify portions of the ASR output data 145 and/or the output data 155 that correspond to named entities associated with the corresponding domain. As used herein, a "domain" refers to a group of related functionality that may be performed by one or more components of the system 100. Example domains include music, video, weather, smart home, news, and calendar. The NER component 172 may also determine whether the ASR output data 145 and/or the output data 155 includes text or a token referring to an entity whose identity is not explicitly mentioned in the ASR output data 145 and/or the output data 155, for example "him," "her," "it" or other anaphora, exophora, or the like.

The NER component 172 may store a grammar database and/or a personalized lexicon. The personalized lexicon may include domain-indexed lexical information associated with the user 105 and/or user device 110. For example, the NER component 172 may store music domain lexical information including album titles, artist names, and song names. for further example, the NER component 172 may store communications domain lexical information including the names of contacts of the user 105. As another example, the NER component 172 may store smart home lexical information including the names of "smart" devices (e.g., electronically controllable door locks, light bulbs, outlets, light switches, etc.) associated with a user profile of the user 105 and/or a group profile associated with the user 105 and/or the user device 110.

The NER component 172 applies grammar and lexical information to determine a mention of one or more entities in the ASR output data 145 and/or the output data 155. The NER component 172 may also label each identified entity with a corresponding entity type (e.g., noun, place, city, artist name, song name, etc.).

The NER component 172 may perform semantic tagging, which is the labeling of a word or combination of words according to type/semantic meaning. The NER component 172 may parse the ASR output data 145 and/or output data 155 using heuristic grammar rules, or a model may be constructed using techniques such as Hidden Markov Models, maximum entropy models, log linear models, conditional random fields (CRF), and the like. For example, the NER component 172 may parse and tag the ASR output data 145 corresponding to "play mother's little helper by the rolling stones" as {Verb}: "Play," {Object}: "mother's little helper," {Object Preposition}: "by," and {Object Modifier}: "the rolling stones."

The NER component 172 may send the ASR output data 145, the output data 155, and the entity data 215 (e.g., indicating entities such as persons, places, objects, etc.) to the metadata extraction component 177.

In some situations, the NER component 172 may only receive and process one of the ASR output data 145 or the output data 155 to determine the entity data 215. It will be appreciated that, in such situations, the NER component 172 may only send the ASR output data 145 or output data 155 it receives to the metadata extraction component 177.

The metadata extraction component 177 processes the ASR output data 145, the output data 155, and/or the entity data 215 to determine metadata 220 associated with the ASR output data 145 and/or the output data 155. The metadata 220 may represent various information, such as a domain associated with the ASR output data 145 and/or the output data 155 (e.g., a weather domain, sports domain, historical domain, etc.), whether further output data is to be output to the user 105, whether the ASR output data 145 and/or the output data 155 include sensitive information (e.g., confidential information, financial information, medical information, etc.), whether the ASR output data includes offensive information (e.g., profanity, culturally insensitive language, etc.), whether the ASR output data 145 and/or the output data 155 include information which was previously deemed appropriate for further output data but resulted in negative user feedback and/or a lack of further interaction by the user 105 (or some threshold number of users of the system 100), whether the user 105 is a child, a sentiment associated with the ASR output data 145 and/or the output data 155 (e.g., happy, playful, sad, upset, etc.), etc.

In some embodiments, the metadata 220 may correspond to a category determined to be associated with the ASR output data 145 and/or the output data 155 (e.g., based on the metadata extraction component 177 classifying the ASR output data 145 and/or the output data 155).

For example, the metadata extraction component 177 may be configured to classify the ASR output data 145 and/or the output data 155 into a category, where the category may correspond to one or more points in a multi-dimensional embedding space of natural language characteristics, wherein each point is associated with one or more different combination of characteristics. The embedding space may be an N-dimensional space, wherein each dimension of the embedding space corresponds to a dimension (e.g., degree of freedom) of the vector representing the input. Points in the embedding space near each other may correspond to natural language characteristics which correspond to similar characteristics, while points far from each other may correspond to natural language characteristics which correspond to dissimilar characteristics. Regions of the embedding space may thus correspond to one or more different characteristics; a first region in the embedding space may, for example, represent natural language inputs which correspond to a particular domain (e.g., weather, sports, historical, etc), while a second region in the embedding space may correspond to natural language inputs which correspond to sensitive information, and a third region in the embedding space may correspond to natural language inputs which correspond to a particular sentiment.

The natural language embedding space may be defined by processing text (or tokenized) data representing user inputs and/or system-generate responses corresponding to natural language exhibiting different characteristics with an encoder, such as a trained neural network encoder. First text (or tokenized) data may, for example, include a user input associated with the characteristics "sensitive information" and "upset." The encoder may process this text (or tokenized) data and determine output embedding data that represents the description of the characteristics. The point and/or region in the embedding space corresponding to the embedded data may then be associated with the characteristics of the natural language text (or tokens) represented by the user input.

The metadata extraction component 177 may send the ASR output data 145, the output data 155, the entity data 215, and the metadata 220 to the prompt determination component 178.

The prompt determination component 178 processes the ASR output data 145, the output data 155, and the metadata 220 to determine whether additional output data is to be output to the user. In some embodiments, the prompt determination component 178 may be configured to additionally determine, if it is determined that additional output data is not to be output, whether a separate component should handle further processing with respect to the ASR output data 145 and/or the output data 155, how the prompt query component 179 should prompt the natural language prompt storage 210 for the natural language prompt data 175, etc.

The prompt determination component 178 may implement one or more machine learning (ML) models. For example, the ML model(s) may be configured to take as input text (or tokenized) data (i.e., the ASR output data 145, the output data 155, and the metadata 220), and classify the text (or tokenized) data into a category to determine whether a natural language prompt, to continue the instant user-system dialog, is appropriate or inappropriate. In some embodiments, the output of the ML model(s) may represent whether output of a natural language prompt is appropriate or inappropriate. For example, the ML model(s) may output a confidence score indicating a confidence that a natural language prompt should be output, and the prompt determination component 178 may determine a natural language prompt should be output if the confidence score satisfies a condition (e.g., meets or exceeds a threshold confidence score). On the other hand, the prompt determination component 178 may determine a natural language prompt should not be output if the confidence score fails to satisfy the condition.

If the ASR output data 145 and/or the output data 155 is determined to be appropriate for a natural language prompt to continue the instant user-system dialog, then the prompt determination component 178 may send the entity data 215 to the prompt query component 179. If, on the other hand, the ASR output data 145 and/or the output data 155 is determined to be inappropriate for a natural language prompt, then the system component(s) 120 may cease processing with respect to determining a natural language prompt for output.

The prompt query component 179 queries the natural language prompt storage 210 for natural language prompt data 175 including one or more natural language prompts associated with the one or more entities represented in the entities 225. The natural language prompt storage 210 may include one or more natural language prompt data(s) 175. A natural language prompt (e.g., "would you like to know more about [entity name]," "would you like to know the weather for [location]," etc.) may be configured to invite the user 105 to continue the user-system dialog (e.g., by providing a subsequent user input). A natural language prompt, in the natural language prompt storage 210, may be stored in association with a natural language representation of an example user input that would result in output of the associated natural language prompt. In some embodiments, a natural language prompt may be stored in the natural language prompt storage 210 in association with an entity, such that the natural language prompt may be identified using the entity. In some embodiments, the natural language prompt storage 210 may be implemented as an OpenSearch index, a vector similarity search index (e.g., Approximate Nearest Neighbors Oh Yeah (Annoy)), or a HashMap.

Figure 3:
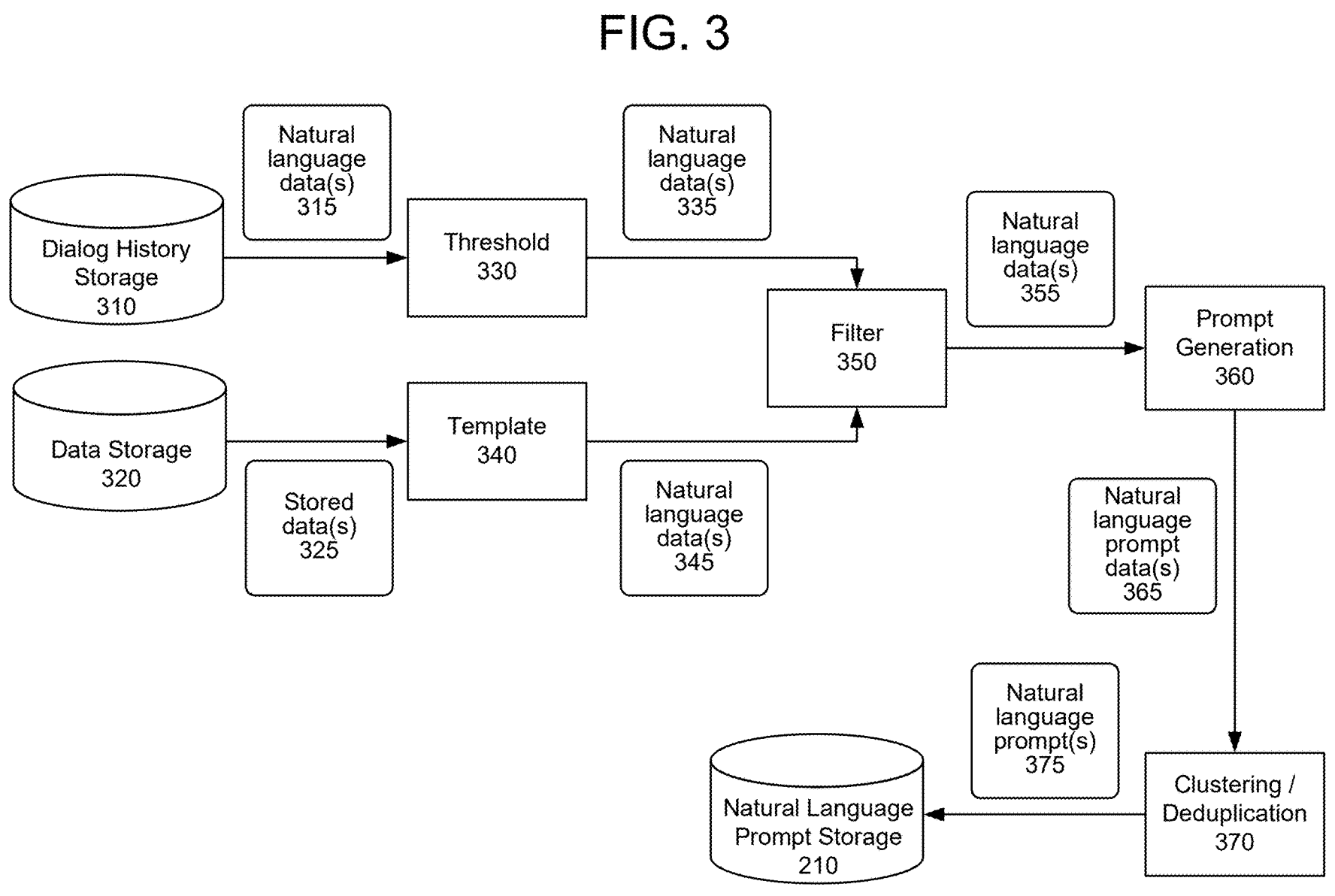

FIG. 3 illustrates example offline processing (e.g., processing performed when the content suggestion component 160 is not performing runtime processing) performed to generate and store one or more natural language prompts in the natural language prompt storage 210. As shown in FIG. 3, in some embodiments, the natural language prompt(s) may be generated using previous user inputs and/or system-generated responses (e.g., output data 155) stored in a dialog history storage 310. For example, the content suggestion component 160 may determine a natural language prompt(s) corresponding to the previous user inputs and/or system-generated responses, and determine to store the natural language prompt(s) in the natural language prompt storage 210, based on the user inputs and/or system-generated responses being received from the user 105 and/or output to the user 105 with a particular frequency. For example, if the system 100 receives a user input corresponding to "what is the weather today," with a frequency that meets or exceeds a threshold (e.g., 5 times in a month), then the content suggestion component 160 may determine to store a natural language prompt corresponding to the user input.

In such an embodiment, a threshold component 330 may process the natural language data 315, in the dialog history storage 310, to identify one or more instances of natural language data 335 therein that correspond to one or more previous user inputs and/or previous system-generated responses that have been received/output with a frequency satisfying (e.g., meeting or exceeding) a threshold frequency. In some embodiments, the threshold component 330 may implement an ML model to identify the one or more instances of natural language data 335 (e.g., a classifier). In some embodiments, the threshold component 330 may implement one or more rules.

In some embodiments, a natural language prompt may be generated using data retrieved from a data storage 320. Data, in the data storage 320, may correspond to information extracted from one or more knowledge sources (e.g., a web-based encyclopedia, a web article, etc.). In some embodiments, the data in the data storage 320 may represent relationships associated with the information extracted from the one or more knowledge sources (e.g., as part of a knowledge graph). In such embodiments, a template component 340 may query the data storage 320 for one or more instances of stored data 325 corresponding to a pre-generated template (e.g., what is an [attribute] by [entity name]). For example, the template component 340 may use the pre-generated template to identify one or more entities and one or more attributes included in an instance of stored data 325 (e.g., an entity of [entity name] and an attribute of "book"). The template component 340 may process the stored data(s) 325 with respect to the template to generate natural language data(s) 345 (e.g., corresponding to "What is a book by [entity name]?"), and may send the natural language data(s) 345 to the filter component 350. In some embodiments, the template component 340 may determine the natural language data(s) 345 using an ML model (e.g., a classifier).

In some embodiments, the content suggestion component 160 may query the dialog history storage 310 and/or the data storage 320 for natural language data based on a metric representing that output associated with the natural language data is being requested by additional users with a particular frequency (e.g., are trending amongst other users). The content suggestion component 160 may determine one or more instances of such natural language data, and may send them to the filter component 350. In further embodiments, the system component(s) 120 may include a component configured to process ASR output data, at runtime, to determine rewrites thereof, based on determining processing with respect to the ASR output may result in an error (e.g., may result in an error in NLU processing). In some instances, the rewrites may be sent to the filter component 350 as natural language data.

The filter component 350 may be configured to filter the natural language data(s) 315, 345 (and optionally produced from rewrites of ASR output data) based on particular quality metrics. For example, the filter component 350 may process the natural language data(s) 315, 345, and may remove any instances of natural language data(s) 315, 345 determined to include offensive language (e.g., profanity, culturally insensitive language, etc.), sensitive data (e.g., confidential information, financial information, etc.), etc. The filter component 350 may send the remaining (non-filtered out) instances of natural language data(s) 315, 345 to the prompt generation component 360 (as the natural language data(s) 355). In some embodiments, the filter component 350 may determine the natural language data 355 using an ML model (e.g., a classifier). In some embodiments, the filter component 350 may implement one or more rules.

The prompt generation component 360 may convert the format of the natural language data(s) 355 to that of a prompt. For example, if an instance of the natural language data 355 corresponds to "[entity name] is 80 years old" or "how old is [entity name]," then the prompt generation component 360 may generate corresponding natural language prompt data 365 including the natural language prompt (in the form of text or tokens) "would you like to know how old [entity name] is." For further example, if an instance of the natural language data 355 corresponds to "[entity name] was established in [year]" or "when was [entity name] established," then the prompt generation component 360 may generate corresponding natural language prompt data 365 including the natural language prompt (in the form of text or tokens) "would you like to know when [entity name] was established." For further example, if an instance of the natural language data 355 corresponds to "[entity name] was born in [location]" or "where was [entity name] born," then the prompt generation component 360 may generate corresponding natural language prompt data 365 including the natural language prompt (in the form of text or tokens) "would you like to know when [entity name] was born."

The prompt generation component 360 may perform generate natural language prompt data(s) 365 using an ML model, such as a text-to-text translation model (e.g., a finetuned T5 model). The prompt generation component 360 may send the natural language prompt data(s) 365 to the clustering/deduplication component 370.

The clustering/deduplication component 370 may be configured to process the natural language prompt data(s) 365 to ensure a diversity of natural language prompts are stored in the natural language prompt storage 210. The clustering/deduplication component 370 may be configured to perform such processing using an ML model. For example, the content suggestion component 160 may include a ML model configured to process the natural language prompt data(s) 365 to generate one or more instances of embedding data. In some embodiments, the ML model may be a language model encoder (e.g., SentenceBERT). The clustering/deduplication component 370 may process the embedding data(s), corresponding to the natural language prompt data(s) 365, using a clustering algorithm (e.g., K-means clustering or spectral clustering) to determine a cluster(s) of the embedding data(s). In some embodiments, the clustering/deduplication component 370 may process the embedding data(s) using a cluster assignment technique, such as locality sensitive hashing or semantic hashing. In such embodiments, the clustering/deduplication component 370 may include a neural sentence encoder that is configured to generate a low dimensional binarized embedding representation of the natural language prompt data(s) 365.

The clustering/deduplication component 370 may select one or more natural language prompts 375 from a cluster to store in the natural language prompt storage 210. In some instances, the clustering/deduplication component 370 may select the one or more natural language prompts 375 based on the one or more natural language prompts 375 being closest to the center of the cluster (or corresponding to a value that is representative of being closest to the center of the cluster) (e.g., a centroid of the cluster).

Referring to FIG. 1, the content determination component 170 may send (at arrow 10) the natural language prompt data 175, including one or more natural language prompts, to the content selection component 180 of the content suggestion component 160.

Figure 4:
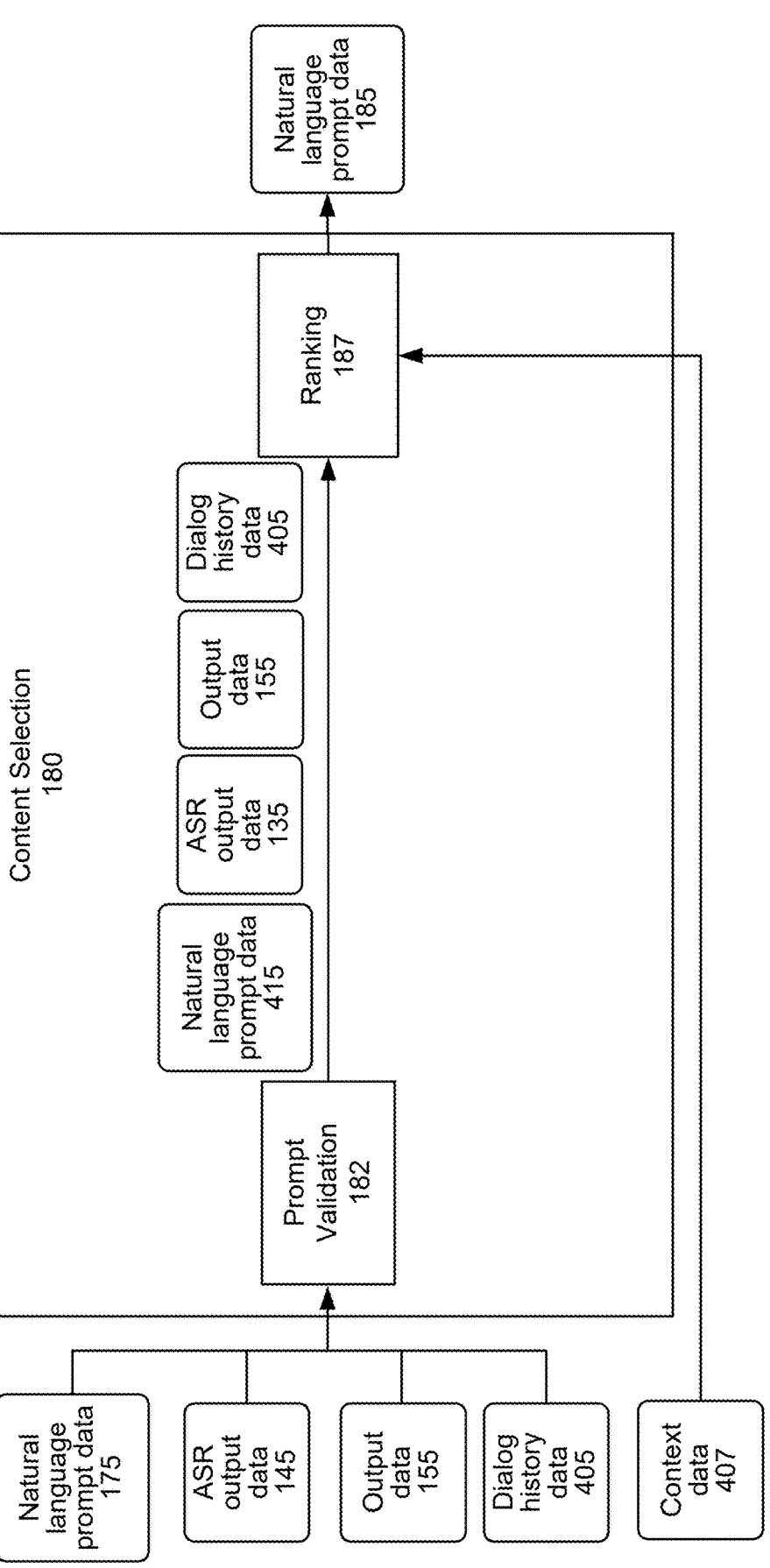
FIG. 4 is a conceptual diagram illustrating example processing performed by a content selection component, according to embodiments of the present disclosure.

FIG. 4 illustrates example processing of the content selection component 180. As shown in FIG. 4, the content selection component 180 may include a prompt validation component 182 and a ranking component 187.

The prompt validation component may receive the natural language prompt data 175, the ASR output data 145, the output data 155, and dialog history data 405. The dialog history data 405 may include at least one user input and/or system-generated response received/output during a previous dialog between the user 105 and the system component(s) 120. The dialog history data 405 may include data corresponding to one or more previous dialogs between the user 105 and the system component(s) 120. In some situations, the dialog history may include short-term dialog history data and/or long-term dialog history data. Short-term dialog history data may represent dialog interactions that occurred within a past threshold amount of time (e.g., within a past hour, day, week, etc.) Long-term dialog history data may represent dialog interactions that occurred previous to the past threshold amount of time (e.g., previous to the past hour, day, week, etc.). In some situations, the prompt validation component 182 may receive history data (not illustrated) including at least one user input and/or system-generated response received/output during a previous interaction between the user 105 and the system component(s) 120, where the history data may not be associated with any particular dialog.

The prompt validation component 182 processes the natural language prompt data 175, the ASR output data 145, the output data 155, and the dialog history data 405 to determine natural language prompt data 415 corresponding to a subset of the natural language prompts represented in the natural language prompt data 175. In some embodiments, the natural language prompt data 415 may include a subset of the natural language prompts, from the natural language prompt data 175, that are classified as belonging to a "non-error category" (as opposed to being classified as belonging to an "error category"). The "error category" may represent natural language prompt data(s) 175 that may result in an unsatisfactory user experience and/or a discontinuance of a user-system dialog if output to the user 105. On the other hand, the "non-error category" may represent natural language prompt data(s) 175 that will likely result in a satisfactory user experience and/or a continuance of a user-system dialog if output to the user 105. For example, in some embodiments, a natural language prompt may be classified as belonging to the non-error category if output of the natural language prompt is likely to result in a subsequent user input requesting information related to the natural language prompt. In some embodiments, the prompt validation component 182 may process a subset of the natural language prompt data 175, the ASR output data 145, the output data 155, and/or the dialog history data 405 to determine the natural language prompt data 415. In some embodiments, the prompt validation component 182 may further process the context data 407 to determine the natural language prompt data 415.

In some embodiments, a natural language prompt may be classified as belonging to the error category if the natural language prompt is semantically equivalent to the ASR output data 145, the output data 155, and/or the dialog history data 405. For example, for the ASR output data 145 "how old is [entity name]," the natural language prompt "what is [entity name]'s age" may be classified as belonging to the error category because, although the natural language prompt and the ASR output data 145 are lexically different, they correspond to the same semantic meaning (e.g., the natural language prompt is a rephrase of the ASR output data 145).

In some embodiments, a natural language prompt may be classified as belonging to the error category if the natural language prompt includes an entity not mentioned in the ASR output data 145, the output data 155, and/or the dialog history data 405. For example, for the ASR output data 145 "what team does [entity name 1] play for," the natural language prompt "what team does [entity name 2] play for" may be classified as belonging to the error category because, although the natural language prompt includes tokens similar to those of the ASR output data 145, the second entity, in the natural language prompt, is different from the first entity "in the ASR output data 145.

In some embodiments, a natural language prompt may be classified as belonging to the error category if the natural language prompt includes an entity similar to an entity represented in the ASR output data 145, the output data 155 and/or the dialog history data 405, but the entity in the natural language prompt is ultimately different from that in the ASR output data 145, the output data 155 and/or the dialog history data 405. For example, for the ASR output data 145 "how old is the University of [state name 1]," the natural language prompt "how many people attend the University of [state name 2]" may be classified as belonging to the error category because, although it contains an entity comprising the words "university of," the entity "University of [state name 1]" is different from the entity "University of [state name 2]."

In some embodiments, an instance of natural language prompt data 175a may be classified as belonging to the error category if the natural language prompt includes the same entity as the ASR output data 145, the output data 155, and/or the dialog history data 405, but the natural language prompt is a non-sequitur. For example, for the ASR output data 145 "what is the capital of [country name]," the natural language prompt data 175a "where is [country name]" may be classified as belonging to the error category because it is not a logical continuation of the ASR output data 145 "what is the capital of [country name]."

The prompt validation component 182 may determine the natural language prompt data 415 using a machine learning (ML) model. For example, the ML model may be configured to take as input first natural language text (or tokenized) data representing a natural language prompt, and one or more instances of natural language text (or tokenized) data representing one or more user inputs and system-generated responses, and classify the natural language text (or tokenized) data as belonging to an error category or non-error category of natural language prompts. In some embodiments, the output of the ML model may represent the classification of the natural language text (or tokenized) data. For example, the ML model may output a confidence score indicating a confidence that a natural language prompt belongs to a non-error category, and the ML model may determine a natural language prompt belongs to the non-error category of natural language prompts if the confidence meets or exceeds a threshold (e.g., 0.5). On the other hand, the ML model may determine a natural language prompt belongs to the error category of natural language prompts if the confidence score fails to meet the threshold.

The ML model may be trained in a supervised manner. During training, the ML model may take as input a concatenation of one or more instances of natural language dialog data (e.g., representing user inputs and system-generated responses of a dialog), a natural language prompt, and an indication of whether the natural language prompt belongs to the non-error category or the error-category. The ML model may be tasked with a binary classification task, where the ML model predicts whether the natural language prompt corresponds to an error category or a non-error category, based on the natural language dialog data. The ML model may output a value representing the prediction (e.g., a value between 0 and 1). In some embodiments, the ML model may be a pre-trained language model (e.g., BERT or ROBERTa).

If a natural language prompt is determined to belong to the non-error category of natural language prompts, then the natural language prompt may be included in the natural language prompt data 415. If, on the other hand, the natural language prompt is determined to belong to the error category of natural language prompts, then the natural language prompt may be omitted from the natural language prompt data 415, and the processing of the system component(s) 120 with respect to the natural language prompt may cease.

The prompt validation component 182 may send the natural language prompt data 415, and optionally one or more of the ASR output data 145, the output data 155, and the dialog history data 405 to the ranking component 187. The ranking component may also receive context data 407. The context data 407 may include various information associated with the user 105 and/or the user device 110 (e.g., time of day, weather for a location of the user device 110, device profile information (e.g., device type, device ID, device state, etc.), user profile information (e.g., age, gender, location, preferences, etc.), frequency of interaction with previously-output natural language prompts, likelihood of interacting with future-output natural language prompts, etc.).

The ranking component 187 processes the received data (or, optionally, a subset of the received data) to determine natural language prompt data 185 including a ranked list of the natural language prompts included in the natural language prompt data 415. In some embodiments, the natural language prompt data 185 may be ranked based on how likely the user 105 is to interact with the natural language prompts included therein (e.g., will result in a subsequent user input associated with the natural language prompt). Alternatively or additionally, in some embodiments, the natural language prompt data 185 is ranked based on how relevant the natural language prompts therein are to the ASR output data 145, the dialog history data 405, and/or the context data 407. Alternatively or additionally, in some embodiments, the natural language prompt data 185 may be ranked based on how likely the user 105 is to be satisfied with the natural language prompts therein.

In some embodiments, the natural language prompt data 185 may include a top-n ranked natural language prompts, where n is less than the number of natural language prompts in the natural language prompt data 415.

The ranking component 187 may determine the natural language prompt data 185 using a machine learning (ML) model. For example, the ML model may be configured to take as input natural language prompts, one or more instances of user inputs and/or system-generated responses, and one or more contexts associated with the user 105 and/or the user device 110, and output a ranked list of the natural language prompts representing how likely the natural language prompts are to be interacted with by the user 105.

In some embodiments, the ML model may be trained using reinforcement learning. During training, the ML model may take as input one or more instances of natural language text (or tokenized) data representing natural language prompts, one or more instances of natural language text (or tokenized) data representing one or more user inputs and/or system-generated responses, and one or more instances of natural language text (or tokenized) data representing one or more contexts associated with the user 105 and/or the user device 110. The ML model may be tasked with determining which natural language prompt to select for output to maximize a reward (e.g., likelihood of user interaction). The output of the ML model may be a representation of which natural language prompt results in the highest likelihood of user interaction. In some embodiments, the ML model may correspond to a reinforcement algorithm, such as a context bandit algorithm (e.g., e-greedy, Thompson sampling, upper-confidence-bound-algorithm, etc.).

During offline processing (e.g., when the content suggestion component 160 is not performing runtime processing), the content suggestion component 160 may be configured to maintain the ranking component 187. In some embodiments, the content suggestion component 160 may store data representing one or more natural language prompts output to the user 105, and instances where the user 105 did not interact with the natural language prompt(s). The content suggestion component 160 may use this data to retrain the ML model of the ranking component 187. In some situations, human annotations made based on the stored data may be used to retrain the ML model of the ranking component 187.

Referring to FIG. 1 once more, the content suggestion component 160 may send (at arrow 11) the natural language prompt data 185 to the orchestrator component 130, which may, in turn, determine a natural language prompt therein (e.g., the top-ranked natural language prompt) to be presented to the user 105.

In some situations, the orchestrator component 130 may cause the natural language prompt to be presented to the user as output data. In such situations, the orchestrator component 130 may send (at arrow 12) the natural language prompt to the output rendering component 190 to generate output data. The output rendering component 190 may be any component configured to generate output data from the natural language prompt. For example, the output rendering component 190 may include or be a TTS component (e.g., the TTS component 980). For further example, the output rendering component may include or be a component configured to generate visual output data (e.g., output image and/or video data) corresponding to the natural language prompt. As another example, the output rendering component may include or be a component configured to generate interactive content (e.g., a graphical user interface (GUI) button) corresponding to the natural language prompt, which is to be presented to the user.

In situations where the output rendering component 190 is or includes a TTS component, the TTS component may process the natural language prompt to generate output audio data including synthesized speech corresponding to the natural language prompt. The output rendering component 190 may send (at arrow 13) the output audio data to the orchestrator component 130, and the orchestrator component 130 may send (at arrow 14) the output audio data to the user device 110 for presentation to the user 105. Example processing of a TTS component 980 is described herein below with respect to FIG. 9.

In some situations, the orchestrator component 130 may cause the natural language prompt to be presented as visual content (e.g., an image or video). In such situations, the orchestrator component 130 may send the natural language prompt to a component of the system 100 to generate visual data corresponding to the natural language prompt, and the orchestrator component 130 may send the visual data to the user device 110 with an instruction to display the visual data.

In some situations, the orchestrator component 130 may cause the natural language prompt to be presented as audio including synthesized speech, as well as visual content.

In some situations, the orchestrator component 130 may cause output data corresponding to the natural language prompt to be presented to the user 105 along with output data (sometimes referred to as natural language output data) responsive to the natural language prompt. For example, if the natural language prompt corresponds to "would you like to know <entity name>'s age," then the orchestrator may cause output data corresponding to the natural language prompt to be presented to the user 105 along with output data corresponding to "<Entity name> is <age>." For example, the user device 110 may cause the response to the natural language prompt to be output after the natural language prompt (e.g., as subsequent synthesized speech and/or subsequent displayed content). To determine the output data responsive to the natural language prompt, the orchestrator component 130 may send the natural language prompt to the NLU component 150 to determine NLU output data representing the natural language prompt (and/or a separate question and answering component of the system that may include one or more knowledge bases and/or query one or more internet sources for answers to queries). The orchestrator component 130 may send the NLU output data to a component configured to determine data responsive to the NLU output data. The orchestrator component 130 may cause the generation of output data corresponding to the data responsive to NLU output data.

In some situations, the orchestrator component 130 may cause natural language output data, responsive to a natural language prompt, to be output without outputting the natural language prompt itself. For example, if the natural language prompt corresponds to "would you like to know <entity name>'s age," then the orchestrator may cause the natural language output data "<Entity name> is <age>" without also causing output of the natural language prompt.

In some embodiments, the orchestrator component 130 may cause more than one natural language prompt, included in the natural language prompt data 185, to be presented to the user 105 in any of the manners described herein above. For example, the orchestrator component 130 may display the natural language prompts to the user 105 as part of a displayed list of natural language prompts.

As discussed herein above, the natural language prompt data 175 determined by the content determination component 170 may be pre-generated during offline processing. However, the present disclosure is not intended to be limited thereto. For example, in some embodiments, the system component(s) 120 may include a prompt generation component configured to generate the natural language prompt data 175 at runtime. In such embodiments, the prompt determination component 178 may send the entities 225 to the prompt generation component to generate the natural language prompt data 175. In some embodiments, the prompt generation component may use the ASR output data 145, the output data 155, and the metadata 220 to generate the natural language prompt data 175. The prompt generation component may send (at arrow 10) the natural language prompt data 175 to the content selection component 180 to process as discussed herein above.

In some embodiments, the prompt generation component may implement an ML model. For example, the ML model may be configured to take as input natural language data (e.g., the ASR output data 145, the output data 155, and/or the entities 225), and may generate the natural language prompt data 175 therefrom. During training, the ML model may take as input natural language data (e.g., the ASR output data 145, the output data 155, and/or the entities 225), a corpus of natural language data (e.g., received from the dialog history storage 310 and/or natural language data generated using data from the data storage 320), and may be tasked with generating a prompt associated with one or more entities included in the natural language data. Thereafter, the generated prompt may be compared to a pre-generated prompt associated with the one or more entities included in the natural language data. Based on the comparison, the prompt generation component may be reconfigured.

In further embodiments, the ML model may be configured to take as input a label associated with the natural language data (e.g., the metadata 220).

In some embodiments, the prompt generation component may be similar to the prompt generation component 360, and may be configured to query (at runtime) the dialog history storage 310 and/or the data storage 320 for natural language data 315 and/or stored data 325 associated with the entities 225. The prompt generation component may generate the natural language prompt data 175 therefrom.

In some embodiments, rather than outputting the natural language prompt as part of an on-going user-system dialog, the content suggestion component 160 may process as described herein above to determine the natural language prompt data 185, and the orchestrator component 130 may send the natural language prompt data 185 to a supplemental content system (e.g., the supplemental content system 500) of the system 100. The supplemental content system 500 is configured to determine when supplemental content is to be presented to the user 105 after a user-system dialog has ended. The supplemental content system 500 is illustrated in FIG. 5.

FIG. 5 illustrates how the supplemental content system 500 may determine inferred content associated with but not directly responsive to a user input as well as determine whether the inferred content should be output to a user. Each time a NLU component 150 (described herein with respect to FIGS. 1 and 9) outputs NLU output data 505, the NLU output data 505 may be input to the supplemental content system 500. The supplemental content system 500 determines whether inferred content associated with but not directly responsive to the user input should be output.

The supplemental content system 500 may base its determinations at least in part on non-user specific data, such as skill-provided data, system generated intent pairs, etc.

The supplemental content system 500 may determine whether inferred content should be output based on data accompanying output data provided to the system component(s) 120 by a skill 925. Such data may be represented as other data 515. In addition to providing the system component(s) 120 with output data responsive to a user input, the skill 925 may provide the system component(s) 120 with presentation framework data. The presentation framework data may include information indicating the types of content (e.g., audio, image, video, etc.) represented in the output data as well as one or more devices associated with the user 5 that should be used to output the different types of output data. The presentation framework data may, in some instances, also include information indicating the system component(s) 120 should determine inferred content associated with the output data, but which is not directly responsive to the user input. When the presentation framework data includes such information, the supplemental content system 500 may determine inferred content may be output.

The supplemental content system 500 may also determine whether inferred content should be output based on data provided to the system component(s) 120 by a skill 925, with the data not accompanying output data. Such data is represented as other data 515. A skill 925 may provide the system component(s) 120 with data indicating that any time the NLU output data 505 indicates a particular intent, the supplemental content system 500 should solicit the skill 925 as to whether the skill 925 has inferred content that may be output. For example, a concert ticket skill may provide the system component(s) 120 with data indicating that anytime the NLU output data 505 indicates a <PlayMusic> intent, the supplemental content system 500 should solicit the concert ticket skill as to whether the concert ticket skill has access to information indicating a concert put on by a resolved artist entity represented in the NLU output data 505. For further example, an electronic calendar skill may provide the system component(s) 120 with data indicating that anytime the NLU output data 505 indicates an <OutputTime> intent, the supplemental content system 500 should solicit the electronic calendar skill as to whether the electronic calendar skill has calendar entries associated with an electronic calendar associated with the user device 110 and/or user 105. Yet further, for example, a traffic report skill may provide the system component(s) 120 with data indicating that anytime the NLU output data 505 indicates a <BookRide> intent, the supplemental content system 500 should solicit the traffic report skill to provide current traffic report information.

The supplemental content system 500 may also determine whether inferred content should be output based on the intent represented in the NLU output data 505. The system component(s) 120 may store intent pair data (illustrated as other data 515) corresponding to pairs of intents. Each pair of intents may be associated with a respective score representing a likelihood that a second intent of the pair will be invoked by a user within a time threshold subsequent to content responsive to the first intent being output. The scores of various intent pairs may be normalized. The intent pair data may be untailored with respect to any given user of the system component(s) 120. For example, the intent pair data may include the following intent pairs with corresponding scores:

[0.345] <GetWeather>; <GetTraffic>

[0.217] <OrderPizza>; <PlayMovie>

[0.121]<PlayMusic>; <SetVolume>

The intent pair data may be configured based solely upon the natures of the intents. For example, a pair of intents may include a <PlayMusic> intent and a <ChangeVolume> intent. The pair of intents may be associated with a score representing a likelihood that a user may input a first user input corresponding to the <PlayMusic> intent immediately prior to the user inputting a second user input corresponding to the <ChangeVolume> intent based solely on the <PlayMusic> intent and the <ChangeVolume> intent both relating to output of audio from the system component(s) 120. For further example, a pair of intents may include a <BookPlaneTicket> intent and a <GetWeather> intent. This pair of intents may be associated with a score indicating a likelihood that users who by plane tickets often ask about the weather for their destination.

Intents may also be paired based on system usage history associated with various different users. Pairing of the intents may be skill agnostic. Thus, both the first intent and the second intent of a pair of intents may be associated with a single skill, or the first intent of the pair may be associated with a first skill while the second intent of the pair may be associated with a second skill. For example, a pair of intents may include a <PlayMusic> intent and a <Change Volume> intent, where both the <PlayMucic> intent and the <Change Volume> intent correspond to a music skill. For further example, a pair of intents may include a <BookPlaneTicket> intent and a <GetWeather> intent, where the <BookPlaneTicket> intent corresponds to a booking skill and the <GetWeather> intent corresponds to a weather skill. Pairing of the intents may also be agnostic with respect to the 1P or 3P nature of the skills associated with the intents. That is, both of the intents of a pair may be associated with one or more 1P skills implemented by the system component(s) 120/user device 110, both of the intents of a pair may be associated with one or more 3P skills in communication with the system component(s) 120/user device 110, or a first intent of a pair may be associated with a 1P skill while the second intent of the pair is associated with a 3P skill. For example, a pair of intents may include a <PlayMusic> intent and a <ChangeVolume> intent, where both the <PlayMusic> intent and the <Change Volume> intent are executed by a 1P skill. For further example, a pair of intents may include a <PlayMusic> intent and a <ChangeVolume> intent, where both the <PlayMusic> intent and the <Change Volume> intent are executed by a 3P music skill. For further example, a pair of intents may include a <BookPlaneTicket> intent and a <PlayMusic> intent, where the <BookPlaneTicket> intent is executed by a 3P skill and the <PlayMusic> intent is executed by a 1P skill.

The intent pair data may alternatively be user-specific. For example, if a user routinely invokes a <Change Volume> intent subsequent to a <PlayMusic> intent, the system component(s) 120 may increase the score associated with a pair of intents corresponding to these intents. Conversely, if the user rarely invokes the <ChangeVolume> intent subsequent to the <PlayMusic> intent, the system component(s) 120 may decrease the score associated with a pair of intents correspond to these intents.

The supplemental content system 500 may also base its determinations at least in part on present user input originating user-specific data. Each user may have a different tolerance regarding how many times inferred content is output in a given period of time, what kinds of inferred content are output, as well as how inferred content is presented.

The supplemental content system 500 may receive user identity data 525 from the user recognition component 995. The user identity data 525 may indicate the present user input originating user 105 (e.g., include a user identifier of the user 105).

If the supplemental content system 500 determines inferred content (an example of supplemental content) should be output, the supplemental content system 500 generates an inferred content request 545, and sends same to a supplemental content system skill 925*a* configured to determine inferred content associated with but not directly responsive to the current user input. The inferred content request 545 may include at least a portion of the NLU output data 505, and optionally at least a portion of the profile data 537 and/or at least a portion of the other data 515.

The inferred content request 545 may indicate a specific skill that should be solicited for inferred content. As described above, a skill may provide the system component(s) 120 with data indicating that any time NLU output data indicates a particular intent, the supplemental content system 500 should solicit the skill as to whether the skill has inferred content that may be output. When the supplemental content system 500 determines the NLU output data 505 indicates the particular intent, the inferred content request 545 may include an indication that the supplemental content system skill 925a should solicit the specific skill for inferred content associated with one or more resolved entities represented in the NLU output data 505.

The supplemental content system skill 925a may determine a skill from which to receive inferred content from based on the NLU output data 505. For example, the supplemental content system skill 925a may determine the NLU output data 505 includes a <PlayMusic> intent and a resolved artist of "Adele." Based thereon, the supplemental content system skill 925a may determine a concert booking skill from which to receive inferred content from.

The supplemental content system skill 925a may send the inferred content request 545 to one or more content publisher 535. A content publisher 535 may provide the supplemental content system skill 925a with inferred content 555 associated with but not directly responsive to the user input. The supplemental content system skill 925a then sends the inferred content 555 to the supplemental content system 500.

In some instances, the content suggestion component 160 may provide one or more instances of natural language prompt data 185 to the supplemental content system skill 925a. The supplemental content system skill 925a may then send the natural language prompt data 185 (as the inferred content 555) to the supplemental content system 500.

In response to receiving the inferred content 555, the supplemental content system 500 may send the adjudicate request 502, corresponding to the inferred content 555, to the filtering component 517. The filtering component 517 may then process as described herein to generate adjudicate response data 522 for the inferred content 555. If the adjudicate response data 522 indicates the inferred content 555 may be output, the supplemental content system 500 may, in response to receiving the adjudicate response data 522, output the inferred content 555 to the user 105 via the user device 110. The inferred content 555 may be output as synthesized speech, displayed text, etc.

In some instances, more than one content publisher 535 may send inferred content to the supplemental content system skill 925a, and the supplemental content system skill 925a may send the multiple instances of inferred content to the supplemental content system 500. In such instances, the supplemental content system 500 may send an adjudicate request for each inferred content to the filtering component 517, and the filtering component 517 may generate an adjudicate response for each adjudicate request. The supplemental content system 500 may then rank which single inferred content, of the various instances of inferred content, should be output based at least in part on the adjudicate responses.

In some embodiments, the supplemental content system 500 may send a batch adjudicate request, indicating various instances of inferred content, to the filtering component 517. In such embodiments, the filtering component 517 may generate a single adjudicate response representing decisions of an evaluation component for the different instances of inferred content, and the supplemental content system 500 may rank which single inferred content to output based at least in part on the single adjudicate response.

In some instances, a content publisher 535 may be unable to determine inferred content, and the content publisher 535 may provide the supplemental content system skill 925a with an indication of such.

In some embodiments, the natural language prompt data 185a may be sent to a notification system (e.g., 600) to determine whether the natural language prompt data 185a should be output to the user 105. As shown in FIG. 6, the notification system 600 may include a topic management component 605, a subscription component 610, a delivery preference component 615, a VUI/GUI subscription and preference management component 620, a delivery management component 625, a content rendering component 630, an event bus 635, an expiry tracking component 640, and/or other components.

The topic management component 605 may include a repository of content topics supported by the notification system 600. Example content topics include, but are not limited to, meeting start time, new email, sporting event update, weather update, taxi arrival, product delivery, and media (e.g., television) start time.

The topic management component 605 may also include a repository of schemas for content topics. A schema may define the structure data is to take for a particular content topic. For example, a schema may indicate data, corresponding to a particular content topic as received from a content publisher 535, is to include supplemental content and one or more particular types of metadata (e.g., an identifier of the content publisher, whether the supplemental content is requested or inferred, a topic of the supplemental content, how the content publisher prefers the supplemental content be indicated to a user(s), how the content publisher prefers the supplemental content be output to a user(s), a validity duration of the supplemental content, etc.). In some embodiments, each schema may be associated with only one content topic, and each content topic may be associated with only one schema. In other embodiments, a schema may be associated with more than one content topic and/or a content topic may be associated with more than one schema.

The topic management component 605 may include one or more APIs. The topic management component 605 may include one or more APIs for content publishers 535 to get a schema. For example, the topic management component 605 may be configured such that each schema is associated with a respective, different API. The topic management component 605 may also include one or more APIs that enable the topic management component 605 to fetch the one or more topics supported by a content publisher 535.

The subscription component 610 may manage all requested supplemental content subscriptions. The subscription component 610 may communicate with a subscription storage (not illustrated) containing all requested supplemental content subscriptions. The subscription component 610 may implement one or more APIs that enable users to subscribe to receive particular supplemental content topics. In some embodiments, the one or more APIs may include one or more Create, Read, Update, and Delete (CRUD) APIs.

When a user/group of users subscribes to receive a content topic, the subscription component 610 may associate, in the subscription storage, a user/group identifier, of the user/group of users, with a content topic indicator corresponding to the content topic. In some situations, the user/group of users may subscribe to receive a content topic from one or more particular content publishers 535. In such situations, the subscription component 610 may associate, in the subscription storage, the user/group identifier with the content topic indicator and each identifier of each of the one or more content publishers 535. The data, in the subscription storage, enables user/group identifier-based retrieval of requested content subscriptions.

The delivery preference component 615 may manage all requested content delivery preferences. The delivery preference component 615 may communicate with a requested content delivery preference storage (not illustrated) containing all requested content delivery preferences. The delivery preference component 615 may implement one or more APIs that enable users to indicate preferences for receiving requested content (e.g., activation of a light indicator, display of a banner, a time when requested content can be or should not be output, etc.). In some embodiments, the one or more APIs may include one or more CRUD APIs.

In some instances, a user/group of users may indicate a delivery preference(s) with respect to a particular content topic. In such instances, the delivery preference component 615 may associate, in the requested content delivery preference storage, a user/group identifier, of the user/group of users, with a content topic indicator, corresponding to the content topic, and data representing the delivery preference(s). In some situations, the user/group of users may indicate a delivery preference(s) with respect to a content topic and one or more particular content publishers 535. In such situations, the delivery preference component 615 may associate, in the requested content delivery preference storage, the user/group identifier with the content topic indicator, each identifier of each of the one or more content publishers 535, and data representing the delivery preference(s). The data, in the requested content delivery preference storage, enables user/group identifier-based retrieval of requested content delivery preferences.

The VUI/GUI subscription and preference management component 620 may be configured to authenticate incoming user inputs that originate from a companion application. A companion application is one that may be installed on a handheld user device 110 (e.g., a smart phone or tablet) and that enables the handheld user device 110 to communicate with the system component(s) 120 and the notification system 600. An example of a companion application is the Amazon Alexa application that may be installed on handheld devices.

The VUI/GUI subscription and preference management component 620 may include one or more APIs. In some embodiments, the one or more APIs may include one or more external proxy representation state transfer (REST) APIs that enable authentication of user inputs. In some embodiments, the one or more APIs may include a backend proxy API.

The delivery management component 625 manages the runtime delivery of content (i.e., determines how content should be indicated to a user). The delivery management component 625 may include one or more APIs to manage runtime delivery of content. In some embodiments, the one or more APIs may include one or more CRUD APIs. For example, when the notification system 600 receives supplemental content for a user, the delivery management component 625 may be called to determine how the supplemental content should be indicated to the user. Such determination may be based on various considerations.

In some embodiments, the delivery management component 625 may determine supplemental content should be indicated only if the corresponding content publisher 535 has registered with the notification system 600 to provide supplemental content to users. In some embodiments, the delivery management component 625 may determine supplemental content should be indicated only if the corresponding content publisher 535 has registered with the notification system 600 to provide supplemental content of the particular content topic of the supplemental content. In some embodiments, the delivery management component 625 may determine supplemental content should be indicated only if one or more devices of the intended recipient are not in a "do not disturb" mode (i.e., device identifiers of the one or more devices are not associated with do not disturb indicators/flags).

The delivery management component 625 may also determine preferences for how supplemental content should be indicated to the intended recipient. For example, the delivery management component 625 may determine a preference(s) of the content publisher 535 and/or the intended recipient. In some embodiments, the preference(s) of the content publisher 535 may be determined from the metadata associated with the received supplemental content. In some embodiments, the preference(s) of the intended recipient may be determined from a subscription(s) of the intended recipient. A preference(s) may indicate an output type for indicating the supplemental content (e.g., activation of a light indicator, display of a GUI element, vibration of a device, etc.) and/or when (e.g., time of day, day of week, etc.) the supplemental content may be indicated.

The delivery management component 625 may determine an output type(s) for indicating supplemental content. The delivery management component 625 may determine the output type(s) based on a preference(s) of a content publisher, a preference(s) of the intended recipient, and/or characteristics/components of one or more devices 110 of the intended recipient.

The content rendering component 630 is configured to generate read-time supplemental content. The content rendering component 630 may generate read-time supplemental content using one or more templates, using a serial peripheral interface (SPI) callback, or determining pre-configured supplemental content (e.g., requested content may be pre-configured). When generating the read-time supplemental content, the content rendering component 630 may validate that the generated supplemental content includes valid speech synthesis markup language (SSML).

The event bus 635 may allow content publishers 535 and other devices to publish events to the notification system 600. The event bus 635 may also allow other systems to subscribe to receive events published to the event bus 635 by components of the notification system 600.

The expiry tracking component 640 is configured to determine when supplemental content is expiring, and causing the supplemental content to be indicated and/or proactively output to an intended user.

Figure 7:
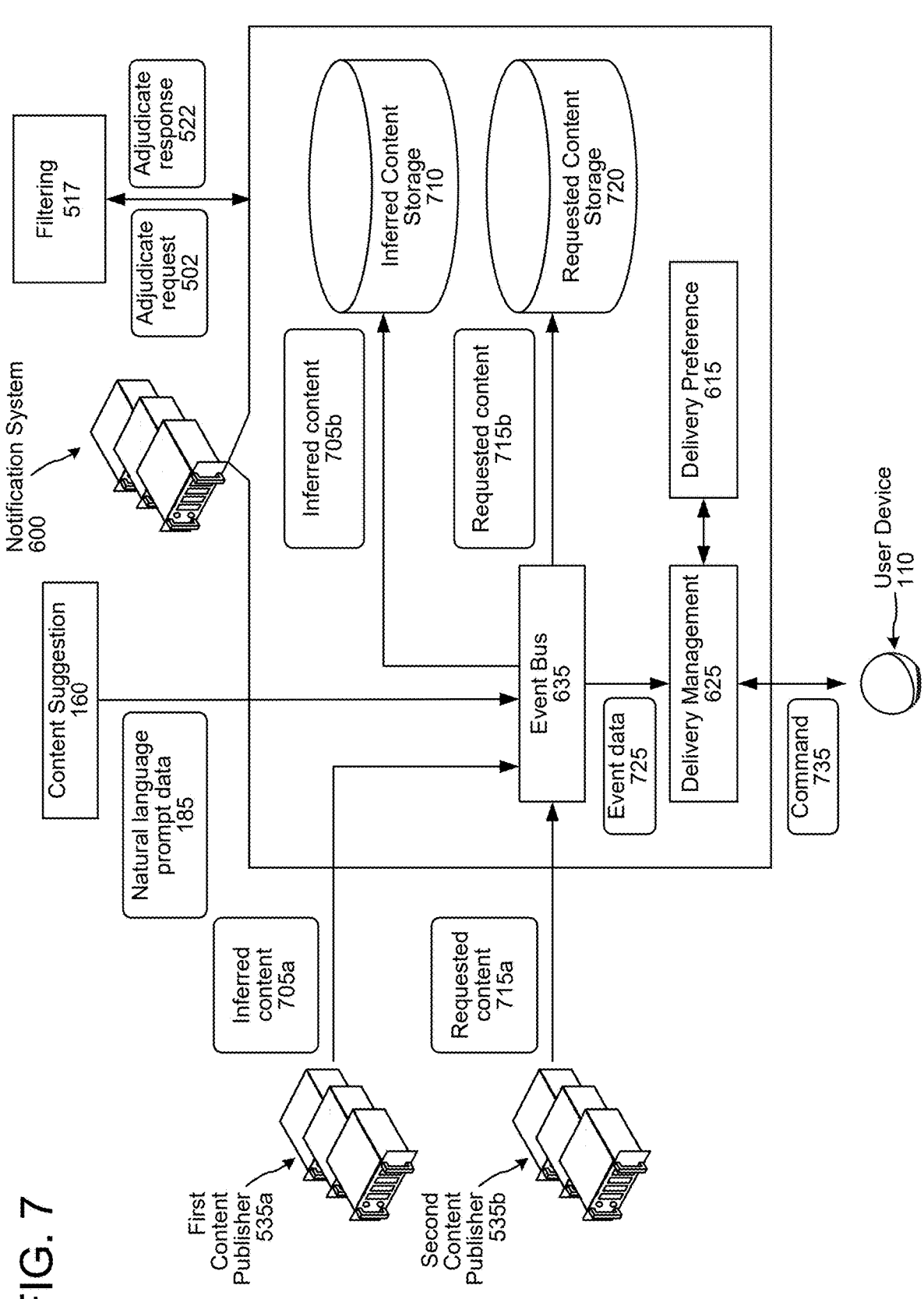
FIG. 7 is a conceptual diagram of components for indicating supplemental content using the notification system, according to embodiments of the present disclosure.

Referring now to FIG. 7, it is described how the notification system 600 may receive supplemental content and indicate same. A first content publisher 535a may send inferred content 705a to the event bus 635 of the notification system 600. In some embodiments, the inferred content 705a may be in a structured, tagged, non-natural language format. In other words, the inferred content 705a may not be in a format suitable for output to an intended user and/or group of users. For example, the inferred content 705a may include "Notification Topic: Shopping Recommendation; Product: [product description]; Price: [product price]," representing a product having a specific price is available for purchase. For further example, the inferred content 705a may include "NotificationTopic: Feature/Functionality Recommendation; Feature/Functionality: [feature/functionality description]," representing a computing feature/functionality is available for use.

In some embodiments, the inferred content 705a may be in natural language. For example, the inferred content 705a may be "[product description] is available for purchase at

[price], would you like me to order it for you?" For further example, the inferred content 705a may be "[feature/functionality description], would you like to enable?"

The inferred content 705a may be accompanied by (i.e., associated with) metadata. In some embodiments, the metadata may include a single user identifier corresponding to a single user to receive the inferred content 705a. For example, the inferred content 705a may recommend a user purchase a product based on the product being included in the user's electronic "wishlist" and/or based on a purchase history of the user. For further example, the inferred content 705a may recommend a feature/functionality of the system component(s) 120/user device 110/skill 925 to a user that has used another feature/functionality of the system component(s) 120/user device 110/skill 925 within a past amount of time (e.g., within a past day, week, month, etc.). In the foregoing examples, the metadata may include the user identifier of the particular user to receive the inferred content 705a.

In some embodiments, the metadata may include a group identifier corresponding to a group of users to receive the inferred content 705a. For example, the inferred content 705a may recommend a user group purchase a product based on the product being included in the user group's electronic "wishlist" and/or based on a purchase history of the user group. For further example, the inferred content 705a may recommend a feature/functionality of the system component(s) 120/user device 110/skill 925 to a user group that has used another feature/functionality of the system component(s) 120/user device 110/skill 925 within a past amount of time (e.g., within a past day, week, month, etc.). In the foregoing examples, the metadata may include the group identifier of the user group to receive the inferred content 705a.

In some embodiments, the metadata may include a user identifier(s) and/or group identifier(s) stored in the profile storage 970. In at least some embodiments, the metadata may include an encoded user identifier corresponding to a user identifier stored in the profile storage 970. In some embodiments, the metadata may include an encoded group identifier corresponding to a group identifier stored in the profile storage 970. In some embodiments, to maintain user privacy, the first content publisher 535a may not have access to a user identifier and/or group identifier stored in the profile storage 970. In these embodiments, the metadata may include an identifier that uniquely corresponds to a particular user identifier and/or group identifier stored in the profile storage 970.

In some embodiments, the metadata may include a parameter for identifying one or more users to receive the inferred content 705a. For example, the inferred content 705a may recommend a feature/functionality of the system component(s) 120/user device 110/skill 925 to users that have used another feature/functionality of the system component(s) 120/user device 110/skill 925 within a past amount of time (e.g., within a past day, week, month, etc.). In this example, the metadata may include the parameter of "used [feature/functionality description] within [past amount of time]."

In some embodiments, the metadata may include multiple user and/or group identifiers corresponding to multiple users and/or user groups to receive the inferred content 705a.

In some embodiments, the metadata may indicate a validity duration of the inferred content 705a. In other words, the metadata may indicate an amount of time (e.g., minutes, hours, days, etc.) that the inferred content 705a is valid for. In other embodiments, the first content publisher 535a may indicate a validity duration of a content topic when the first content publisher 535a registers with the notification system 600 to provide supplemental content to users thereof. In such embodiments, the metadata may include a content topic (e.g., product recommendation, feature/functionality recommendation, etc.), and the notification system 600 may determine the content topic in the metadata, determine the inferred content 705a and metadata was received from the first content publisher 535a, and, based on the foregoing, determine a validity duration of the inferred content 705a.

In some embodiments, the metadata may indicate an output type the first content publisher 535a recommends be used to output the inferred content 705a. For example, the metadata may indicate the inferred content 705a should be output as synthesized speech. For further example, the metadata may indicate the inferred content 705a should be output using a display. As another example, the metadata may indicate the inferred content 705a should be output both as synthesized speech and using a display. In a further example, the metadata may indicate the inferred content 705a may be output either as synthesized speech or using a display.

In some embodiments, the metadata may include a first content publisher identifier corresponding to the first content publisher 535a.

In some embodiments, the first content publisher 535a may send the inferred content 705a and associated metadata to the event bus 635 via an API.

In some embodiments, the content suggestion component 160 may send one or more instances of natural language prompt data 185 (a form of inferred content 705a) to the event bus 635.

The event bus 635 may communicate with an inferred content storage 710. The inferred content storage 710 may be implemented by the notification system 600. When the metadata, associated with the inferred content 705a, includes a user identifier, the inferred content storage 710 may store an association between inferred content 705b (corresponding to the inferred content 705a), the user identifier, and the metadata. When the metadata, associated with the inferred content 705a, includes a group identifier, the inferred content storage 710 may store an association between the inferred content 705b, the group identifier, and the metadata. Additionally or alternatively, when the metadata, associated with the inferred content 705a, includes a group identifier, the notification system 600 may determine one or more user identifiers associated with the group identifier, and the inferred content storage 710 may store an association between the inferred content 705b, the metadata, and each of the one or more user identifier associated with the group identifier. When the metadata, associated with the inferred content 705a, includes a parameter for identifying one of more users, the notification system 600 may determine one or more user identifiers and/or one or more group identifiers corresponding to the parameter (e.g., having a usage history, user demographic information, etc. corresponding to the parameter), and the inferred content storage 710 may store an association between the inferred content 705a, the metadata, and each of the one or more user identifiers and/or group identifiers corresponding to the parameter.

In some situations, the inferred content storage 710 may store more than one inferred content associated with a single user or group identifier at a point in time. In some embodiments, the notification system 600 may be configured to determine a score (e.g., confidence score, probability score, etc.) representing inferred content should in fact be output to a user. The inferred content storage 710 may associate inferred content with its respective score such that the inferred contents associated with a single user or group identifier may effectively be ranked within the inferred content storage 710 according to priority of output.

In some embodiments, the inferred content 705b may be a copy of the inferred content 705a. For example, the inferred contents 705a/705b may both be a structured, non-natural language formatted inferred content.

In some embodiments, the notification system 600 may receive the inferred content 705a in a structured, non-natural language form, but the inferred content storage 710 may store the inferred content 705b in a natural language form. In some embodiments, the notification system 600 may use a template-based approach to generate the natural language formatted inferred content 705b. A template may include natural language with portions (e.g., variables) to be populated with information from the structured, non-natural language inferred content 705a. A template may be associated with a content publisher 535. A template may additionally or alternatively be associated with a content topic. In some embodiments, the notification system 600 may perform one or more art-known/industry-known natural language generation techniques using the structured, non-natural language inferred content 705a to generate the corresponding natural language inferred content 705b.

In some embodiments, upon receiving the inferred content 705a and associated metadata, the notification system 600 may send an adjudicate request 502, corresponding to the inferred content 705a, to the filtering component 517. The filtering component 517 may then process as described herein to generate adjudicate response data 522 for the inferred content 705a. If the adjudicate response data 822 indicates the inferred content 705a may be output, the notification system 600 may, in response to receiving the adjudicate response data 522, store the inferred content 705b and associated data in the inferred content storage 710. Conversely, if the adjudicate response data 522 indicates the inferred content 705a should not be output, the notification system 600 may, in response to receiving the adjudicate response data 522, prevent the inferred content 705a and associated data from being stored in the inferred content storage 710.

In some embodiments, inferred content may not be output until a user receives requested content as well. In such embodiments, the storage of the inferred content 705b (and associated metadata) in the inferred content storage 710 may not, in and of itself, cause other processing of the notification system 600 to be commenced.

Sometime after receiving and storing the inferred content 705a/705b, a second content publisher 535b may send requested content 715a to the event bus 635. While FIG. 7 illustrates first and second content publishers 535a/535b, it will be appreciated that the same content publisher may send both the inferred content 705a and the requested content 715a to the event bus 635.

In some embodiments, the requested content 715a may be in a structured, tagged, non-natural language format. In other words, the requested content 715a may not be in a format suitable for output to an intended user and/or group of users. For example, the requested content 715a may include "Notification Topic: Meeting; Participant: John; Time: 15 minutes," representing a meeting with John is starting in 15 minutes. For further example, the requested content 715a may include "NotificationTopic: Email; SenderName: Jane; Time: 2 minutes," representing an email was received from Jane 2 minutes ago. In another example, the requested content 715a may include "NotificationTopic: GameUpdate;

SportsTeamName: Seahawks; Time: 30 minutes," representing a Seahawks game is starting in 30 minutes. For further example, the requested content 715a may include "NotificationTopic: Weather Update; Weather: Rain; Time: 45 minutes," representing it will start raining in about 45 minutes. In another example, the requested content 715a may include "NotificationTopic: Taxi Update; TaxiServiceName: Bob's; ArrivalTime: 3 minutes; Vehicle: Red sedan; LicensePlate: ABCD1234; PickupLocation: 123 First Street," representing a red sedan, having license plate ABCD1234, from Bob's taxi service will be arriving in about 3 minutes at 123 First Street. For further example, the requested content 715a may include "NotificationTopic: Delivery Update; Product: Dish soap; Delivery Time: 45 minutes," representing ordered dish soap is expected to be delivered in about 45 minutes. In another example, the requested content 715a may include "NotificationTopic: Media Update; TelevisionShow: News; Time: 10 minutes," representing the news will begin being televised in 10 minutes.

In some embodiments, the requested content 715a may be in natural language. For example, the requested content 715a may be "meeting with John is starting in 15 minutes." For further example, the requested content 715a may be "you received an email from Jane 2 minutes ago." In another example, the requested content 715a may be "the Seahawks game is starting in 30 minutes." For further example, the requested content 715a may be "it will start raining in about 45 minutes." In another example, the requested content 715a may be "a red sedan, having license plate ABCD1234, from Bob's taxi service will be arriving in about 3 minutes at 123 First Street." For further example, the requested content 715a may be "your dish soap order is expected to be delivered in about 45 minutes." In another example, the requested content 715a may be "the news will begin in 10 minutes."

The requested content 715a may be accompanied by (i.e., associated with) metadata. In some embodiments, the metadata may include a single user identifier corresponding to a single user to receive the requested content 715a. In some embodiments, the metadata may include a group identifier corresponding to a group of users to receive the requested content 715a. In some embodiments, the metadata may include multiple user and/or group identifiers corresponding to multiple users and/or user groups to receive the requested content 715a.

In some embodiments, the metadata may include a user identifier(s) and/or group identifier(s) stored in the profile storage 970. In at least some embodiments, the metadata may include an encoded user identifier corresponding to a user identifier stored in the profile storage 970. In some embodiments, the metadata may include an encoded group identifier corresponding to a group identifier stored in the profile storage 970. In some embodiments, to maintain user privacy, the second content publisher 535b may not have access to a user identifier and/or group identifier stored in the profile storage 970. In these embodiments, the metadata may include an identifier that uniquely corresponds to a particular user identifier and/or group identifier stored in the profile storage 970.

In some embodiments, the metadata may indicate a validity duration of the requested content 715a. In other words, the metadata may indicate an amount of time (e.g., minutes, hours, days, etc.) that the requested content 715a is valid for. In other embodiments, the second content publisher 535b may indicate a validity duration of a content topic when the second content publisher 535b registers with the notification system 600 to provide supplemental content to users thereof. In such embodiments, the metadata may include a content topic (e.g., email notification, sporting event update, etc.), and the notification system 600 may determine the content topic in the metadata, determine the requested content 715a and metadata was received from the second content publisher 535b, and, based on the foregoing, determine a validity duration of the requested content 715a.

In some embodiments, the metadata may indicate an output type the second content publisher 535b recommends be used to notify the user(s) and/or user group(s) of the requested content 715a. For example, the metadata may represent indication of the requested content 715a should be conducted by activating a light indicator (e.g., a light ring, light emitting diode (LED), etc.) in a particular manner (e.g., exhibit a particular color, blink in a particular manner, etc.); displaying a GUI element, such as a banner, card, or the like; vibrating in a particular manner (e.g., at a particular vibration strength, particular vibration pattern, etc.); and/or using some other notification mechanism.

In some embodiments, the metadata may indicate an output type the second content publisher 535b recommends be used to output the requested content 715a. For example, the metadata may indicate the requested content 715a should be output as synthesized speech. For further example, the metadata may indicate the requested content 715a should be output using a display. As another example, the metadata may indicate the requested content 715a should be output both as synthesized speech and using a display. In a further example, the metadata may indicate the requested content 715a may be output either as synthesized speech or using a display.

In some embodiments, the metadata may include a second content publisher identifier corresponding to the second content publisher 535b.

In some embodiments, the second content publisher 535b may send the requested content 715a and associated metadata to the event bus 635 via an API. In some embodiments, the notification system 600 may be configured with a first API for sending inferred content to the event bus 635, and a second API for sending requested content to the event bus 635. In some embodiments, the notification system 600 may be configured with a single API for sending supplemental content (i.e., inferred content and requested content) to the event bus 635. In such embodiments, supplemental content may be associated with metadata indicating whether the supplemental content is inferred or requested. Additionally or alternatively, in such embodiments, the metadata may include a content topic, and the notification system 600 may determine whether associated supplemental content is inferred or requested based on the content topic.

The event bus 635 may communicate with a requested content storage 720. The requested content storage 720 may be implemented by the notification system 600. When the metadata, associated with the requested content 715a, includes a user identifier, the requested content storage 720 may store an association between requested content 715b (corresponding to the requested content 715a), the user identifier, and the metadata. When the metadata, associated with the requested content 715a, includes more than one user identifier, the requested content storage 720 may store an association between the requested content 715b, the metadata, and each of the more than one user identifiers. When the metadata, associated with the requested content 715a, includes a group identifier, the requested content storage 720 may store an association between the requested content 715b, the group identifier, and the metadata. Additionally or alternatively, when the metadata, associated with the requested content 715a, includes a group identifier, the notification system 600 may determine one or more user identifiers associated with the group identifier, and the requested content storage 720 may store an association between the requested content 715b, the metadata, and each of the one or more user identifiers associated with the group identifier.

In some situations, the requested content storage 720 may store more than one requested content associated with a single user or group identifier at a point in time. In some embodiments, the notification system 600 may be configured to determine a score (e.g., confidence score, probability score, etc.) representing requested content should in fact be output to a user. The requested content storage 720 may associate requested content with its respective score such that the requested contents associated with a single user or group identifier may effectively be ranked within the requested content storage 720 according to priority of output.

In some embodiments, the requested content 715b may be a copy of the requested content 715a. For example, the requested contents 715a/715b may both be a structured, non-natural language formatted requested content.

In some embodiments, the notification system 600 may receive the requested content 715a in a structured, non-natural language form, but the requested content storage 720 may store the requested content 715b in a natural language form. In some embodiments, the notification system 600 may use a template-based approach to generate the natural language formatted requested content 715b. A template may include natural language with portions (e.g., variables) to be populated with information from the structured, non-natural language requested content 715a. A template may be associated with a content publisher 535. A template may additionally or alternatively be associated with a content topic. In some embodiments, the notification system 600 may perform one or more art-known/industry-known natural language generation techniques using the structured, non-natural language requested content 715 to generate the corresponding natural language requested content 715b.

In some embodiments, the subscription component 610 (of the notification system 600) may confirm the intended user and/or group or users subscribed to receive the requested content 715a prior to storing the requested content 715b in the requested content storage 720. For example, the subscription component 610 may determine the user identifier and/or group identifier associated with the requested content 715a, and determine (in a subscription storage) whether the user and/or group identifier is associated with an identifier of the second content publisher 535b (and optionally the content topic represented in the metadata associated with the requested content 715a). If the subscription component 610 determines the user and/or group of users has not subscribed to receive the requested content 715a (e.g., the subscription storage is not storing an association between the user and/or group identifier and an identifier of the second content publisher 535b, and optionally the content topic), the subscription component 610 may prevent the requested content 715b from being stored in the requested content storage 720. Conversely, if the subscription component 610 determines the user and/or group of users has subscribed to receive the requested content 715a (e.g., the subscription storage is storing an association between the user and/or group identifier and an identifier of the second content publisher 535b, and optionally the content topic), the subscription component 610 may store the requested content 715*b* in the requested content storage 720.

As described above, the notification system 600 may be configured to store supplemental content in two separate storages (i.e., store inferred content in the inferred content storage 710 and requested content in the requested content storage 720). In some embodiments, the notification system 600 may store all supplemental content in a single supplemental content storage (not illustrated). In such embodiments, in addition to the data associations detailed above, each supplemental content in the single supplemental content storage may be associated with data indicating whether the supplemental content is inferred or requested.

It will be appreciated that the foregoing processing and storage with respect to the inferred content 705*b* and requested content 715*b* may be performed with respect to additional inferred content and/or requested content intended for a same user and/or group of users.

After receiving the requested content 715*a* from the second content publisher 535*b* (and optionally after storing the requested content 715*b* in the requested content storage 720), the event bus 635 may publish event data 725 representing the requested content 715*a* has been received (or the requested content 715*b* has been stored). The delivery management component 625 subscribes to receiving such event data 725. Upon receiving the event data 725, the delivery management component 625 may determine whether the user and/or group of users should be notified that the requested content 715*b* is available for output.

The user and/or group of users (and more particularly the user and/or group profile data of the user and/or group of users) may be associated with one or more devices 110 configured to notify the user and/or group of users using one or more techniques. For example, the user and/or group of users may be associated with one or more devices 110 configured to notify the user, that the requested content 715*b* is available for output, by activating a light indicator (e.g., a light ring, light emitting diode (LED), etc.) in a particular manner (e.g., exhibit a particular color, blink in a particular manner, etc.); displaying a GUI element, such as a banner, card, or the like; vibrating in a particular manner (e.g., at a particular vibration strength, particular vibration pattern, etc.); and/or use some other mechanism. The delivery management component 625 may determine which device(s) 110 and which notification mechanism(s) should be used to notify the user and/or group of users of that the requested content 715*b* is available for output.

The delivery management component 625 may determine how to notify the user(s) of the requested content 715*b* based on device characteristics. The event data 725 may include the user and/or group identifier associated with the requested content 715*b* in the requested content storage 720. The delivery management component 625 may query the profile storage 970 for device characteristic data associated with one or more device identifiers associated with the user and/or group identifier. A given user device 110's device characteristic data may represent, for example, whether the user device 110 has a light(s) capable of indicating the requested content 715*b* is available for output, whether the user device 110 includes or is otherwise in communication with a display capable of indicating the requested content 715*b* is available for output, and/or whether the user device 110 includes a haptic component capable of indicating the requested content 715*b* is available for output.

The delivery management component 625 may indicate the requested content 715*b* is available for output based on the device characteristic data. For example, if the delivery management component 625 receives first device characteristic data representing a first user device 110*a* includes a light(s), the delivery management component 625 may send, to the first user device 110*a*, a first command 735*a* to activate the light(s) in a manner that indicates the requested content 715*b* is available for output. In some situations, two or more devices of the user and/or group of users may be capable of indicating the requested content 715*b* is available for output using lights of the two or more devices. In such situations, the delivery management component 625 may send, to each of the two or more devices, a command to cause the respective device's light(s) to indicate the requested content 715*b* is available for output.

The delivery management component 625 may additionally or alternatively receive second device characteristic data representing a second user device 110*b* includes or is otherwise in communication with a display. In response to receiving the second device characteristic data, the delivery management component 625 may send, to the second user device 110*b*, a second command 735*b* to display text, an image, a popup graphical element (e.g., a banner) that indicates the requested content 715*b* is available for output. For example, the displayed text may correspond to "you have an unread notification." But the text may not include specifics of the requested content 715*b*. An example of the second command 735*b* may be a mobile push command.

In some situations, two or more devices of the user and/or group of users may be capable of indicating the requested content 715*b* is available for output by displaying content. In such situations, the delivery management component 625 may send, to each of the two or more devices, a command to cause the respective device to display content indicating the requested content 715*b* is available for output.

The delivery management component 625 may additionally or alternatively receive third device characteristic data representing a third user device 110*c* includes a haptic component. In response to receiving the device characteristic data, the delivery management component 625 may send, to the third user device 110*c*, a third command 735*c* to vibrate in a manner that indicates the requested content 715*b* is available for output.

The delivery management component 625 may determine how to indicate the requested content 715*b* is available for output based on a user and/or group preference(s) corresponding to the user and/or group identifier associated with the requested content 715*b* in the requested content storage 720. For example, the delivery management component 625 may query the delivery preference component 615 for one or more indication preferences associated with the user and/or group identifier. An indication preference may indicate whether requested content is to be indicated using a light indicator, displayed content, vibration, and/or some other mechanism. An indication preference may indicate requested content, corresponding to a particular content topic, is to be indicated using a light indicator, displayed content, vibration, and/or some other mechanism.

The delivery management component 625 may additionally or alternatively determine how to indicate the requested content 715*b* is available for output based on a preference of the second content publisher 535*b* that provided the requested content 715*a*. For example, during offline operations, the second content publisher 535*b* may indicate requested content is to be indicated using a light indicator, displayed content, vibration, and/or some other mechanism. For further example, during offline operations, the second content publisher 535*b* may indicate requested content, corresponding to a particular content topic, is to be indicated using a light indicator, displayed content, vibration, and/or some other mechanism. In another example, the second content publisher 535*b* may indicate, at runtime, how the requested content 715*a* is to be indicated. For example, the requested content 715*a* may be associated with metadata representing how the requested content 715*a* is to be indicated to the user and/or group of users. The delivery management component 625 may query the delivery preference component 615 for one or more indication preferences associated with the identifier of the second content publisher 535*b*, and optionally the content topic associated with the requested content 715*a*.

In some situations, the delivery preference component 615 may determine and send, to the delivery management component 625, a user preference(s) and a content publisher preference(s) for indicating the requested content 715*b* is available for output. The delivery management component 625 may give priority to the user preference(s) in situations where the user preference(s) does not conform with the content publisher preference(s) (e.g., the user preference(s) indicates the requested content 715*b* is to be indicated using a light(s), but the content publisher preference(s) indicates the requested content 715*b* is to be indicated using displayed content).

In some situations, the delivery management component 625 may determine no user device 110 of the user and/or group of users is capable of indicating the requested content 715*b* as preferred by either a user preference(s) or a content publisher preference(s). In such situations, the delivery management component 625 may cause the device(s) 110 of the user and/or group of users to indicate the requested content 715*b* according to characteristics of the device(s) 110.

In some situations, while the device(s) 110 is indicating the requested content 715*b* is available for output, the event bus 635 may receive additional requested content intended for the same user and/or group of users. Thus and in some embodiments, after receiving the event data 725, the delivery management component 625 may determine whether a device(s) 110 of the user and/or group of users is presently indicating the requested content 715*b* is available for output.

As part of the foregoing determination, the delivery management component 625 may determine a user and/or group identifier represented in the event data 725. If the event data 725 includes an encoded user and/or group identifier, the delivery management component 625 may perform one or more art-known/industry-known decoding techniques on the encoded user and/or group identifier to determine the corresponding user and/or group identifier. If the event data 725 includes a unique identifier as described previously, the delivery management component 625 may use a table (including unique identifiers associated with respective user and/or group identifiers) to determine the unique identifier is associated with a particular user and/or group identifier.

After receiving or determining the user and/or group identifier, the delivery management component 625 may determine one or more device identifiers (e.g., device serial numbers) associated with the user and/or group identifier. In other words, the delivery management component 625 determines one or more device identifiers corresponding to one or more devices 110 registered to a user and/or group of users corresponding to the user and/or group identifier.

Thereafter, the delivery management component 625 may determine whether at least one of the one or more device identifiers is associated with data (e.g., a flag or other indicator) representing a device(s) 110 is presently indicating requested content is available for output. If the delivery management component 625 determines a device(s) 110 is presently indicating requested content is available for output, the delivery management component 625 may cease processing with respect to the event data 725 (and not send an additional command(s) to the device(s) 110). Conversely, if the delivery management component 625 determines no devices 110 of the user and/or group of users are presently indicating requested content is available for output, the delivery management component 625 may determine how the requested content 715*b* is to be indicated to the user and/or group of users (as described herein above).

Figure 8:
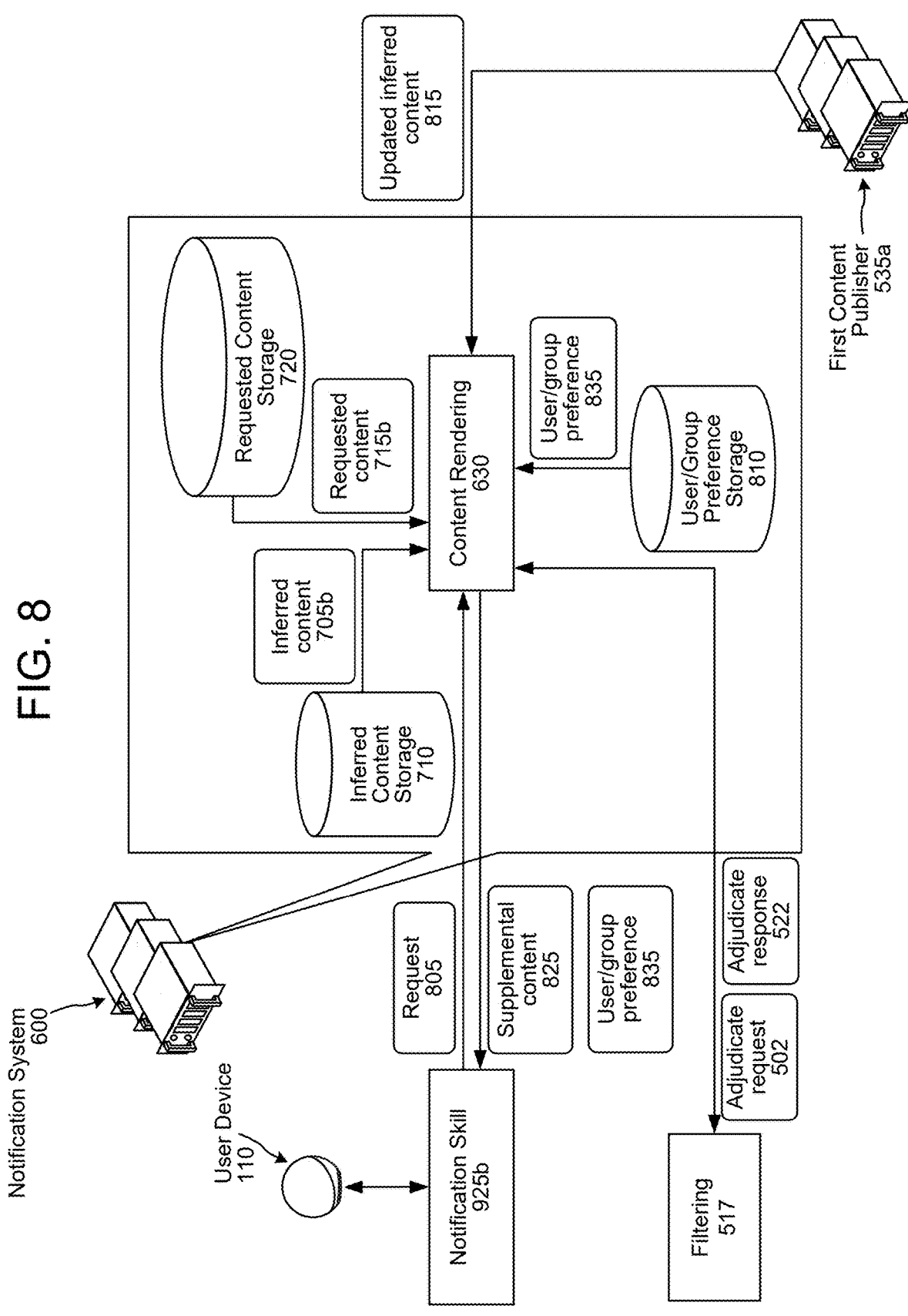
FIG. 8 is a conceptual diagram of components for outputting requested and inferred content using the notification system, according to embodiments of the present disclosure.

Referring to FIG. 8, sometime while the at least one user device 110 of the user and/or group of users is indicating the requested content 715*b* is available for output, a user device 110 of the user and/or group of users may receive a user input to output supplemental content(s) of the user and/or group of users. For example, the user device 110 may receive audio corresponding to a spoken natural language user input to output supplemental content(s). An example of such a spoken natural language user input may be "what are my notifications," "output my notifications," and the like. For further example, the user device 110 may receive a textual (e.g., typed) natural language user input to output supplemental content(s). In another example, the user device 110 may include or otherwise be associated with a camera that captures a sequence of images representing the user 5 performing a gesture (an example of a user input) to output supplemental content(s). In a further example, the user device 110 may include a button or display a virtual button (or other graphical user interface (GUI) element capable of being interacted with by the user 5), and the user device 110 may detect the user 5 interacting with the button or other GUI element (an example of a user input) to output supplemental content(s).

In some embodiments, the user device 110 may send data, representing the user input, to the system component(s) 120 for processing. In some instances, the user device 110 may be configured to communicate with (i.e., send data to and received data from) the system component(s) 120 via an application installed on the user device 110 and associated with the system component(s) 120. Such an application may be referred to as a companion application. An example of such an application is the Amazon Alexa application that may be installed on a smart phone or tablet.

The user device 110 and/or system component(s) 120 (depending on the components illustrated in FIGS. 8-9 being implemented) processes data representing the user input (e.g., audio data representing a spoken natural language user input, text data representing a text-based natural language user input, data representing a performed gesture, data representing a button interaction, etc.) to determine skill input data (e.g., NLU output data) representing the user input requests supplemental content(s) be output, and including a user and/or group identifier associated with the user device 110 (that captured the user input) and/or user 5 (that provided the user input). In response, the user device 110/system component(s) 120 may send the skill input data to a notification skill 925*b*.

The notification skill 925*b* processes the skill input data to determine the skill input data represents supplemental content(s) is to be output, and includes the user and/or group identifier. In response to such processing, the notification skill 925*b* generates request data 805 including the user and/or group identifier and requesting supplemental content(s) associated with the user and/or group identifier.

The notification skill 925b sends the request data 805 to the content rendering component 630 of the notification system 600.

In response to receiving the request data 805, the content rendering component 630 queries the requested content storage 720 for requested content associated with the user and/or group identifier represented in the request data 805. In response, the content rendering component 630 receives at least the requested content 715b. Moreover, in response to receiving the request data 805, the content rendering component 630 queries the inferred content storage 710 for inferred content associated with the user and/or group identifier represented in the request data 805. In response, the content rendering component 630 receives at least the inferred content 705b.

Since the inferred content 705b may not be output until after the user or group of users is notified of the requested content 715b, it will be appreciated that a duration of time may occur between when the notification system 600 stores the inferred content 705b in the inferred content storage 710 and when the notification skill 925b sends the request data 805 to the content rendering component 630. In some situations, the inferred content 705b may be outdated or otherwise need updating prior to being output. For example, if the inferred content 705b is a shopping recommendation that includes a number of available products, the inferred content 705b may need to be updated to reflect a number of available products at the time of output to the user and/or group of users.

In view of the foregoing, the content rendering component 630 may determine the inferred content 705b was received from the first content publisher 535a (e.g., based on an identifier of the first content publisher 535a being associated with the inferred content 705b in the inferred content storage 710). Thereafter, the content rendering component 630 may send an update content request to the first content publisher 535a. The update content request may include an identifier uniquely identifying the inferred content 705b to the first content publisher 535a. In some embodiments, this identifier may be represented in the metadata associated with the inferred content 705a/805b. In some embodiments, the content rendering component 630 may send the update content request via a serial peripheral interface (SPI). As such, if the content rendering component 630 receives multiple inferred contents from the inferred content storage 710, the content rendering component 630 may send a respective update content request to two or more different content publishers 535 via the SPI.

In response to receiving the update content request, the first content publisher 535a may determine the inferred content 705b as stored by the first content publisher 535a, and may generate updated inferred content 815 therefrom. In some embodiments, the updated inferred content 815 may be in a structured, non-natural language format. In some embodiments, the updated inferred content 815 may be in a natural language format. In some embodiments, the first content publisher 535a may perform art-known/industry-known natural language generation processing to generate the updated inferred content 815.

For example, if the inferred content 705b corresponds to "a deal just started for [product name]," the first content publisher 535a may determine (in response to receiving the update content request) that 85% of the product has been sold, and the updated inferred content 815 may be generated to correspond to "a deal for [product name] is 85% sold out" or "a deal for [product name] is almost sold out." As such, it will be appreciated that the first content publisher 535a may generate the updated inferred content 815 based on information that became available to the first content publisher 535a after the first content publisher 535a sent the inferred content 705a to the notification system 600.

In some embodiments, in response to receiving the update content request, the first content publisher 535a may determine additional inferred content that became available after sending the inferred content 705a to the notification system 600. In such embodiments, the first content publisher 535a may perform natural language generation (or other) processing to generate the updated inferred content 815 to correspond to the inferred content 705b and the additional inferred content. For example, if the inferred content 705b is a shopping recommendation for a first product, the additional inferred content may be a shopping recommendation for a second product that became on sale after the inferred content 705a was originally sent to the notification system 600.

In some embodiments, the content rendering component 630 may determine a rating associated with a content publisher 535 (or other value representing the content publisher 535 will generate the updated inferred content 815 without including profanity or other adult-only content), and may only send the update content request to the content publisher 535 if the rating (or other value) satisfies a condition (e.g., meets or exceeds a threshold rating/value). Such processing configures the content rendering component 630 to only send an update content request to a content publisher 535 trusted by the content rendering component 630, as in some embodiments the content rendering component 630 may not be configured to check the updated inferred content 815 for profanity or other adult-only content. The rating or other value may be based at least in part on user feedback data received from users of the system 100 with respect to previous data generated by the content publisher 535.

In some embodiments, the first content publisher 535a may not generate the updated inferred content 815 in response to receiving the update content request (e.g., in situations wherein the first content publisher 535a is unaware of any updated or additional inferred content).

In some embodiments, rather than sending the inferred content 705a to the event bus 635, the first content publisher 535a may send, to the event bus 635, data indicating the first content publisher 535a wants inferred content to be output to the user or group of users. In such embodiments and in response to receiving the request data 805, the content rendering component 630 may query the first content publisher 535a for inferred content, and the first content publisher 535a may in turn send the updated inferred content 815 to the content rendering component 630.

The content rendering component 630 sends, to the notification skill 925b, supplemental content 825. In some embodiments, the supplemental content 825 may include at least the requested content 715b and the inferred content 705b (e.g., in the situation where the first content publisher 535a does not send the updated inferred content 815 to the content rendering component 630). In at least some embodiments, the supplemental content 825 may include at least the requested content 715b and the updated inferred content 815.

In at least some embodiments, the supplemental content 825 may only include the requested content 715b. For example, upon receiving the inferred content 705b or updated inferred content 815, the content rendering component 630 may send an adjudicate request 502, corresponding to the inferred content 705b or updated inferred content 815, to the filtering component 517. The filtering component 517 may then process as described herein to generate adjudicate response data 522 for the inferred content 705*b* or updated inferred content 815. If the adjudicate response data 522 indicates the inferred content 705*b* or updated inferred content 815 should not be output, the content rendering component 630 may, in response to receiving the adjudicate response data 522, not include the inferred content 705*b* or updated inferred content 815 in the supplemental content 825.

In some embodiments, the content rendering component 630 may only include the inferred content 705*b*, or updated inferred content 815, in the supplemental content 825 if the inferred content 705*b*, or updated inferred content 815, corresponds to a same content topic (or domain) as the requested content 715*b*.

Additionally, in response to receiving the request data 805, the content rendering component 630 may query a user/group preference storage 810 (which may be stored by the notification system 600) for user/group preference data 835 associated with the user and/or group identifier, and may send the user/group preference data 835 to the notification skill 925*b*. The user/group preference data 835 may represent one or more user/group preferences for ordering the output of supplemental contents. For example, a user/group preference may represent a certain content topic is to be output prior to any other content topic. For further example, a user/group preference may represent a first content topic is to be output prior to a second content topic.

The user/group preference data 835 may represent one or more user/group preferences regarding output of supplemental content on specific device types. For example, a user/group preference may represent inferred content is to be output using a specific device type, using a specific output type (e.g., synthesized speech, displayed content, etc.), and/ or at a specific time of day.

Whereas the content rendering component 630 may be configured to send all data, required to output supplemental content, to the notification skill 925*b*, the notification skill 925*b* may be configured to construct the output to the user. The notification skill 925*b* may generate an ordering (of the supplemental contents) based on the user/group preference data 835 and/or one or more default ordering rules (which may order supplemental contents based on content topic (e.g., inferred v. requested, shopping v. system feature/ functionality, sporting event score update v. new email, etc.)). In some embodiments, the notification skill 925*b* may implement a rules engine that processes the user/group preference data 835 and the default ordering rule(s) to determine the ordering. In some embodiments, the notification skill 925*b* may implement a heuristics-based algorithm (or other type of algorithm) that takes into consideration the user/group preference data 835 and the default ordering rule(s) for determining the ordering. In at least some embodiments, the notification skill 925*b* may implement a machine learning model that processes the user/group preference data 835 and the default ordering rule(s) to determine the ordering.

The notification skill 925*b* may determine how the supplemental contents should be output. For example, the notification skill 925*b* may determine the supplemental contents should be output as synthesized speech. For further example, the notification skill 925*b* may determine the supplemental contents should be displayed. In another example, the notification skill 925*b* may determine the supplemental contents should be both output as synthesized speech and displayed.

The notification skill 925*b* may determine the inferred content 705*b*, or the updated inferred content 815, should not be output based on how the supplemental contents are to be output. For example, the notification skill 925*b* may determine the user/group preference data 835 indicates a content topic is to be output using a specific mechanism (e.g., synthesized speech and/or displayed), may determine the inferred content 705*b* or updated inferred content 815 corresponds to the content topic, determine the supplemental contents are to be output using a mechanism other than the user/group preferred mechanism, and based thereon determine the inferred content 705*b* or updated inferred content 815 should not be output.

In some embodiments, the notification skill 925*b* may determine supplemental content to be output was received by the notification skill 925*b* in a structured, non-natural language format. In some embodiments, the notification skill 925*b* may use an art-known/industry-known template-based approach to generate natural language supplemental content corresponding to the structured, non-natural language supplemental content. In some embodiments, the notification skill 925*b* may use an art-known/industry-known natural language generation processing-based approach to generate natural language supplemental content corresponding to the structured, non-natural language supplemental content.

In embodiments where the notification skill 925*b* determines the supplemental contents are to be output as audio, the notification skill 925*b* may send a respective natural language representation of each supplemental content to be output to the TTS component 980, and the TTS component 980 may perform TTS processing on each instance of natural language supplemental content to generate different instances of audio data including synthesized speech corresponding to respective natural language supplemental content. The notification skill 925*b* may then cause the different audio data (corresponding to the different natural language synthesized speech of the different supplemental contents) to be sent to the user device 110 (in situations wherein the notification skill 925*b* is not implemented by the user device 110) and output by the user device 110 in the order determined by the notification skill 925*b*. This may include the notification skill 925*b* causing order data to be sent to the user device 110, with the order data representing the order determined by the notification skill 925*b*.

In some embodiments, the notification skill 925*b* may generate ordered natural language supplemental contents corresponding to the different instances of the natural language supplemental content in the order determined by the notification skill 925*b*. In such embodiments, the notification skill 925*b* may send the ordered natural language supplemental contents to the TTS component 980, and the TTS component 980 may perform TTS processing on the ordered natural language supplemental contents to generate a single instance of audio data including synthesized speech corresponding to the ordered natural language supplemental content. The notification skill 925*b* may then cause the audio data to output by the user device 110.

Additionally or alternatively, the notification skill 925*b* may determine the natural language supplemental contents are to be displayed as natural language text. In such embodiments, the notification skill 925*b* may cause different instances of natural language text data (each corresponding to a different instance of natural language supplemental content) to be displayed by the user device 110 (using a display of or otherwise associated with the user device 110) in the order determined by the notification skill 925*b*. This may include the notification skill 925*b* causing order data to be sent to the user device 110, with the order data representing the order determined by the notification skill 925*b*. In some embodiments, the notification skill 925*b* may send a single instance of natural language text data (corresponding to the ordered natural language supplemental contents) to be sent to the user device 110 for output. In some embodiments, the user device 110 may display natural language text (corresponding to different supplemental contents) in a list format.

In some embodiments, the notification skill 925*b* may cause one or more devices, associated with the same user and/or group profile data as the user device 110 that captured the user input requesting supplemental content be output, to output the foregoing synthesized speech and/or display the foregoing natural language text.

In some embodiments, the system component(s) 120 may generate the output data 155 and send the output data 155 to the content suggestion component 160 prior to sending the output data 155 to the user device 110. In some embodiments, the system component(s) may send the output data 155 and output data generated using the natural language prompt data 185 to the user device 110 together, and may cause the user device 110 to output the output data 155 and the output data generated using the natural language prompt data 185 to the user 105.

Figure 9:
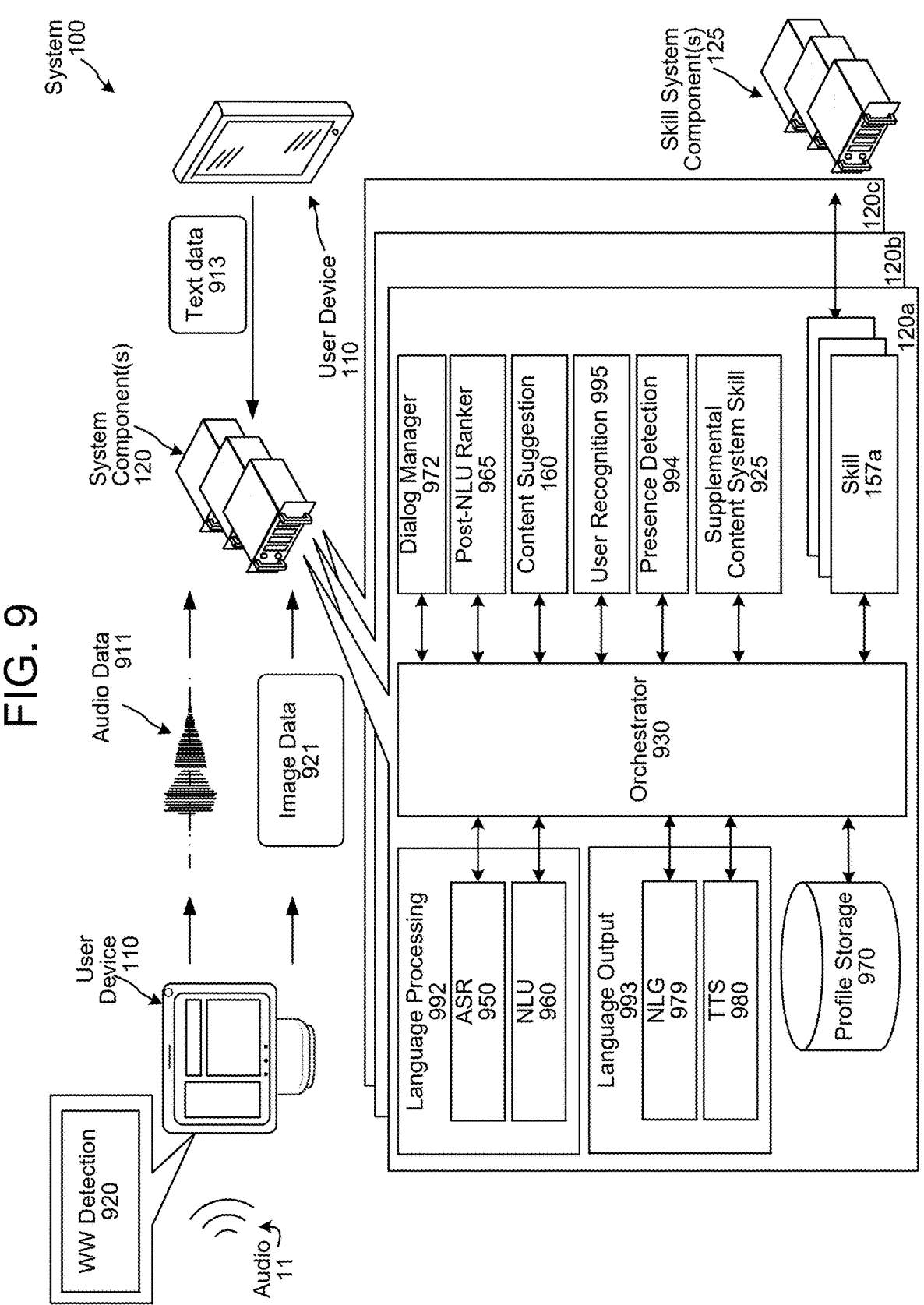
FIG. 9 is a conceptual diagram of components of the system, according to embodiments of the present disclosure.

The system 100 may operate using various components as described in FIG. 9. The various components may be located on same or different physical devices. Communication between various components may occur directly or across a network(s) 199. The user device 110 may include audio capture component(s), such as a microphone or array of microphones of a user device 110, captures audio 11 and creates corresponding audio data. Once speech is detected in audio data representing the audio 11, the user device 110 may determine if the speech is directed at the user device 110/system component(s) 120. In at least some embodiments, such determination may be made using a wakeword detection component 920. The wakeword detection component 920 may be configured to detect various wakewords. In at least some examples, each wakeword may correspond to a name of a different digital assistant. An example wakeword/digital assistant name is "Alexa." In another example, input to the system may be in form of text data 913, for example as a result of a user typing an input into a user interface of user device 110. Other input forms may include indication that the user has pressed a physical or virtual button on user device 110, the user has made a gesture, etc. The user device 110 may also capture images using camera(s) 1118 of the user device 110 and may send image data 921 representing those image(s) to the system component(s) 120. The image data 921 may include raw image data or image data processed by the user device 110 before sending to the system component(s) 120. The image data 921 may be used in various manners by different components of the system to perform operations such as determining whether a user is directing an utterance to the system, interpreting a user command, responding to a user command, etc.

The wakeword detection component 920 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 920 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 920 may be built on deep neural network (DNN)/recursive neural network (RNN) structures directly, without HMM being involved. Such an architecture may estimate the posteriors of wakewords with context data, either by stacking frames within a context window for DNN, or using RNN.

Follow-on posterior threshold tuning or smoothing is applied for decision making. Other techniques for wakeword detection, such as those known in the art, may also be used.

Once the wakeword is detected by the wakeword detection component 920 and/or input is detected by an input detector, the user device 110 may "wake" and begin transmitting audio data 911, representing the audio 11, to the system component(s) 120. The audio data 911 may include data corresponding to the wakeword; in other embodiments, the portion of the audio corresponding to the wakeword is removed by the user device 110 prior to sending the audio data 911 to the system component(s) 120. In the case of touch input detection or gesture based input detection, the audio data may not include a wakeword.

In some implementations, the system 100 may include more than one system component(s) 120. The system component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 920 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 157 of one or more system component(s) 120.

The user device 110 may also include a system directed input detector. (The system component(s) 120 may also include a system directed input detector which may operate in a manner similar to system directed input detector.) The system directed input detector 1085 may be configured to determine whether an input to the system (for example speech, a gesture, etc.) is directed to the system or not directed to the system (for example directed to another user, etc.). The system directed input detector may work in conjunction with the wakeword detection component 920. If the system directed input detector determines an input is directed to the system, the user device 110 may "wake" and begin sending captured data for further processing (for example, processing audio data using the language processing 992/1092, processing captured image data using an image processing component or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1085 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector is determining whether an input is potentially device directed. For example, the system may output an orange indicator while considering an input, and may output a green indicator if a system directed input is detected. Other such configurations are possible.

Upon receipt by the system component(s) 120, the audio data 911 may be sent to an orchestrator component 930. The orchestrator component 930 may include memory and logic that enables the orchestrator component 930 to transmit various pieces and forms of data to various components of the system, as well as perform other operations as described herein.

The orchestrator component 930 may send the audio data 911 to a language processing component 992. The language processing component 992 (sometimes also referred to as a spoken language understanding (SLU) component) includes an automatic speech recognition (ASR) component 950 and a natural language understanding (NLU) component 960. The ASR component 950 may transcribe the audio data 911 into text data. The text data output by the ASR component 950 represents one or more than one (e.g., in the form of an N-best list) ASR hypotheses representing speech represented in the audio data 911. The ASR component 950 interprets the speech in the audio data 911 based on a similarity between the audio data 911 and pre-established language models. For example, the ASR component 950 may compare the audio data 911 with models for sounds (e.g., acoustic units such as phonemes, senons, phones, etc.) and sequences of sounds to identify words that match the sequence of sounds of the speech represented in the audio data 911. The ASR component 950 sends the text data generated thereby to an NLU component 960, via, in some embodiments, the orchestrator component 930. The text data sent from the ASR component 950 to the NLU component 960 may include a single top-scoring ASR hypothesis or may include an N-best list including multiple top-scoring ASR hypotheses. An N-best list may additionally include a respective score associated with each ASR hypothesis represented therein.

The language processing system 992 may further include a NLU component 960. The NLU component 960 may receive the text data from the ASR component. The NLU component 960 may attempts to make a semantic interpretation of the phrase(s) or statement(s) represented in the text data input therein by determining one or more meanings associated with the phrase(s) or statement(s) represented in the text data. The NLU component 960 may determine an intent representing an action that a user desires be performed and may determine information that allows a device (e.g., the user device 110, the system component(s) 120, a skill component 157, a skill system component(s) 125, etc.) to execute the intent. For example, if the text data corresponds to "play the 5th Symphony by Beethoven," the NLU component 960 may determine an intent that the system output music and may identify "Beethoven" as an artist/composer and "5th Symphony" as the piece of music to be played. For further example, if the text data corresponds to "what is the weather," the NLU component 960 may determine an intent that the system output weather information associated with a geographic location of the user device 110. In another example, if the text data corresponds to "turn off the lights," the NLU component 960 may determine an intent that the system turn off lights associated with the user device 110 or the user 5. However, if the NLU component 960 is unable to resolve the entity—for example, because the entity is referred to by anaphora such as "this song" or "my next appointment"—the language processing system 992 can send a decode request to another language processing system 992 for information regarding the entity mention and/or other context related to the utterance. The language processing system 992 may augment, correct, or base results data upon the audio data 911 as well as any data received from the other language processing system 992.

The NLU component 960 may return NLU results data (which may include tagged text data, indicators of intent, etc.) back to the orchestrator component 930. The orchestrator component 930 may forward the NLU results data to a skill component(s) 157. If the NLU results data includes a single NLU hypothesis, the NLU component 960 and the orchestrator component 930 may direct the NLU results data to the skill component(s) 157 associated with the NLU hypothesis. If the NLU results data includes an N-best list of NLU hypotheses, the NLU component 960 and the orchestrator component 930 may direct the top scoring NLU hypothesis to a skill component(s) 157 associated with the top scoring NLU hypothesis. The system may also include a post-NLU ranker 965 which may incorporate other information to rank potential interpretations determined by the NLU component 960. The local user device 110 may also include its own post-NLU ranker 1065, which may operate similarly to the post-NLU ranker 965.

A skill component may be software running on the system component(s) 120 that is akin to a software application. That is, a skill component 157 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 157. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 157 may operate in conjunction between the system component(s) 120 and other devices, such as the user device 110, in order to complete certain functions. Inputs to a skill component 157 may come from speech processing interactions or through other interactions or input sources. A skill component 157 may include hardware, software, firmware, or the like that may be dedicated to a particular skill component 157 or shared among different skill components 157.

A skill support system component(s) 125 may communicate with a skill component(s) 157 within the system component(s) 120 and/or directly with the orchestrator component 930 or with other components. A skill support system component(s) 125 may be configured to perform one or more actions. An ability to perform such action(s) may sometimes be referred to as a "skill." That is, a skill may enable a skill support system component(s) 125 to execute specific functionality in order to provide data or perform some other action requested by a user. For example, a weather service skill may enable a skill support system component(s) 125 to provide weather information to the system component(s) 120, a car service skill may enable a skill support system component(s) 125 to book a trip with respect to a taxi or ride sharing service, an order pizza skill may enable a skill support system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 157 dedicated to interacting with the skill support system component(s) 125. Unless expressly stated otherwise, reference to a skill, skill device, or skill component may include a skill component 157 operated by the system component(s) 120 and/or skill operated by the skill support system component(s) 125. Moreover, the functionality described herein as a skill or skill may be referred to using many different terms, such as an action, bot, app, or the like. The skill component 157 and or skill support system component(s) 125 may return output data to the orchestrator component 930.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 972 that manages and/or tracks a dialog between a user and a device.

The dialog manager component 972 may associate a dialog session identifier with the dialog upon identifying that the user is engaging in a dialog with the user. The dialog manager component 972 may track a user input and the corresponding system generated response to the user input as a turn. The dialog session identifier may correspond to multiple turns of user input and corresponding system generated response. The dialog manager component 972 may transmit data identified by the dialog session identifier directly to the orchestrator component 930 or other component. Depending on system configuration the dialog manager component 972 may determine the appropriate system generated response to give to a particular utterance or user input of a turn. Or creation of the system generated response may be managed by another component of the system (e.g., the language output component 993, NLG 979, orchestrator component 930, etc.) while the dialog manager component 972 selects the appropriate responses. Alternatively, another component of the system component(s) 120 may select responses using techniques discussed herein. The text of a system generated response may be sent to a TTS component 980 for creation of audio data corresponding to the response. The audio data may then be sent to a user device (e.g., user device 110) for ultimate output to the user. Alternatively (or in addition) a dialog response may be returned in text or some other form.

The dialog manager component 972 may receive the ASR hypothesis/hypotheses (i.e., text data) and make a semantic interpretation of the phrase(s) or statement(s) represented therein. That is, the dialog manager component 972 determines one or more meanings associated with the phrase(s) or statement(s) represented in the text data based on words represented in the text data. The dialog manager component 972 determines a goal corresponding to an action that a user desires be performed as well as pieces of the text data that allow a device (e.g., the user device 110, the system component(s) 120, a skill component 157, a skill system component(s) 125, etc.) to execute the intent. If, for example, the text data corresponds to "what is the weather," the dialog manager component 972 may determine that that the system component(s) 120 is to output weather information associated with a geographic location of the user device 110. In another example, if the text data corresponds to "turn off the lights," the dialog manager component 972 may determine that the system component(s) 120 is to turn off lights associated with the device(s) 110 or the user(s) 5.

The dialog manager component 972 may send the results data to one or more skill component(s) 157. If the results data includes a single hypothesis, the orchestrator component 930 may send the results data to the skill component(s) 157 associated with the hypothesis. If the results data includes an N-best list of hypotheses, the orchestrator component 930 may send the top scoring hypothesis to a skill component(s) 157 associated with the top scoring hypothesis.

The system component(s) 120 includes a language output component 993. The language output component 993 includes a natural language generation (NLG) component 979 and a text-to-speech (TTS) component 980. The NLG component 979 can generate text for purposes of TTS output to a user. For example the NLG component 979 may generate text corresponding to instructions corresponding to a particular action for the user to perform. The NLG component 979 may generate appropriate text for various outputs as described herein. The NLG component 979 may include one or more trained models configured to output text appropriate for a particular input. The text output by the NLG component 979 may become input for the TTS component 980 (e.g., output text data discussed below). Alternatively or in addition, the TTS component 980 may receive text data from a skill component 157 or other system component for output.

The NLG component 979 may include a trained model. The NLG component 979 generates text data from dialog data received by the dialog manager component 972 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 980.

The TTS component 980 may generate audio data (e.g., synthesized speech) from text data using one or more different methods. Text data input to the TTS component 980 may come from a skill component 157, the orchestrator component 930, or another component of the system. In one method of synthesis called unit selection, the TTS component 980 matches text data against a database of recorded speech. The TTS component 980 selects matching units of recorded speech and concatenates the units together to form audio data. In another method of synthesis called parametric synthesis, the TTS component 980 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 911 representing the commands to the system component(s) 120 for processing, after which the system component(s) 120 may return output data that can cause the user device 110 to engage its camera.

Upon receipt by the system component(s) 120, the image data 921 may be sent to an orchestrator component 930. The orchestrator component 930 may send the image data 921 to an image processing component. The image processing component can perform computer vision functions such as object recognition, modeling, reconstruction, etc. For example, the image processing component may detect a person, face, etc. (which may then be identified using user recognition component 995). The device may also include an image processing component.

In some implementations, the image processing component can detect the presence of text in an image. In such implementations, the image processing component can recognize the presence of text, convert the image data to text data, and send the resulting text data via the orchestrator component 930 to the language processing component 992 for processing by the NLU component 960.

The system component(s) 120 may include a user recognition component 995 that recognizes one or more users using a variety of data. However, the disclosure is not limited thereto, and the user device 110 may include a user recognition component 1095 instead of and/or in addition to user recognition component 995 of the system component(s) 120 without departing from the disclosure. User recognition component 1095 operates similarly to user recognition component 995.

The user recognition component 995 may take as input the audio data 911 and/or text data output by the ASR component 950. The user recognition component 995 may perform user recognition by comparing audio characteristics in the audio data 911 to stored audio characteristics of users. The user recognition component 995 may also perform user recognition by comparing biometric data (e.g., fingerprint data, iris data, etc.), received by the system in correlation with the present user input, to stored biometric data of users assuming user permission and previous authorization. The user recognition component 995 may further perform user recognition by comparing image data (e.g., including a representation of at least a feature of a user), received by the system in correlation with the present user input, with stored image data including representations of features of different users. The user recognition component 995 may perform additional user recognition processes, including those known in the art.

The user recognition component 995 determines scores indicating whether user input originated from a particular user. For example, a first score may indicate a likelihood that the user input originated from a first user, a second score may indicate a likelihood that the user input originated from a second user, etc. The user recognition component 995 also determines an overall confidence regarding the accuracy of user recognition operations.

Output of the user recognition component 995 may include a single user identifier corresponding to the most likely user that originated the user input. Alternatively, output of the user recognition component 995 may include an N-best list of user identifiers with respective scores indicating likelihoods of respective users originating the user input. The output of the user recognition component 995 may be used to inform NLU processing as well as processing performed by other components of the system.

The system component(s) 120/user device 110 may include a presence detection component 994/1094 that determines the presence and/or location of one or more users using a variety of data.

The system 100 (either on user device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 10:
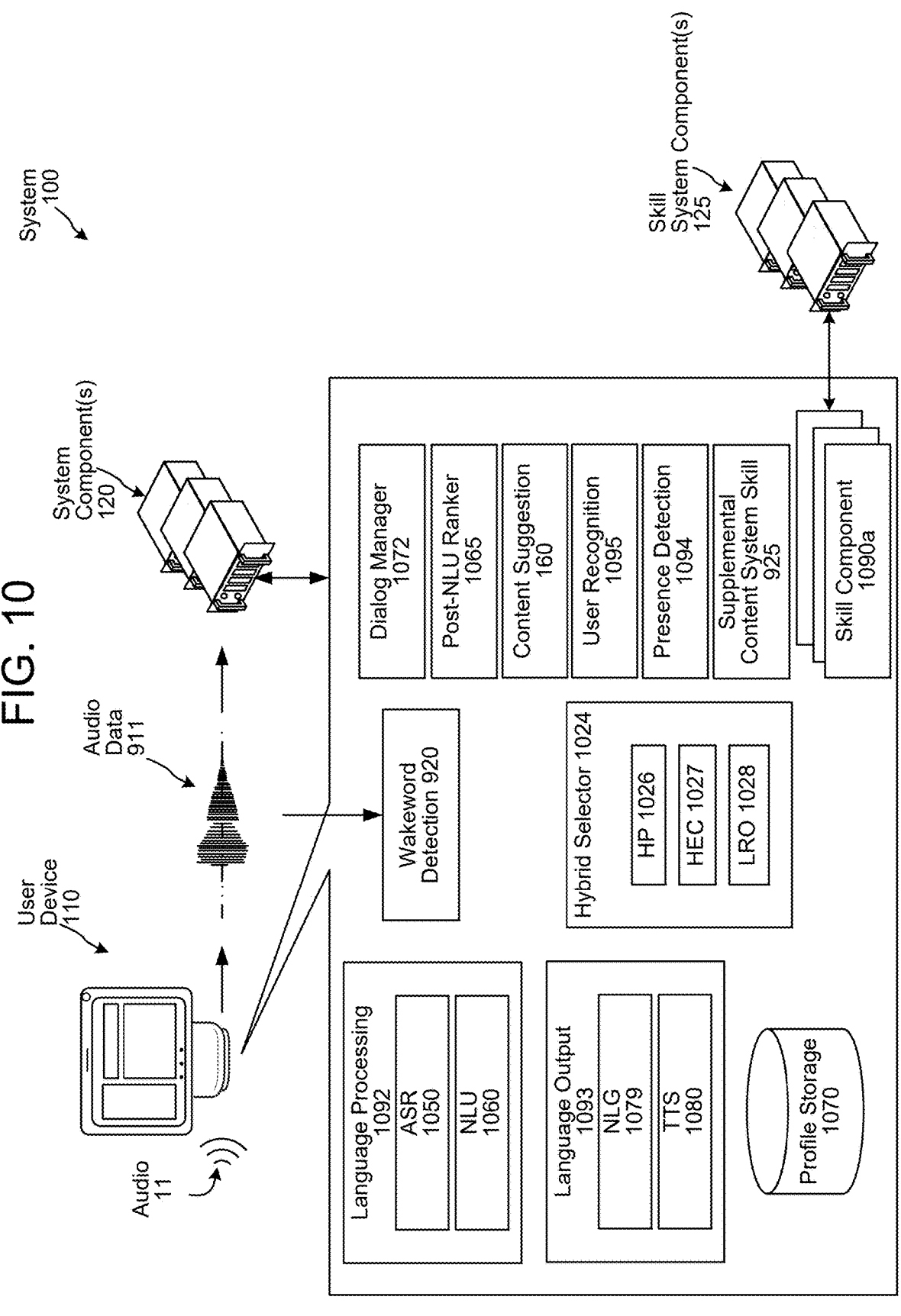
FIG. 10 is a conceptual diagram illustrating components that may be included in a device, according to embodiments of the present disclosure.

Although the components of FIG. 9 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 10 illustrates such a configured user device 110.

In at least some embodiments, the system component(s) 120 may receive the audio data 911 from the user device 110, to recognize speech corresponding to a spoken input in the received audio data 911, and to perform functions in response to the recognized speech. In at least some embodiments, these functions involve sending directives (e.g., commands), from the system component(s) 120 to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 1080) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 9, the user device 110 may include a wakeword detection component 920 configured to compare the audio data 911 to stored models used to detect a wakeword (e.g., "Alexa") that indicates to the user device 110 that the audio data 911 is to be processed for determining NLU output data (e.g., slot data that corresponds to a named entity, label data, and/or intent data, etc.). In at least some embodiments, a hybrid selector 1024, of the user device 110, may send the audio data 911 to the wakeword detection component 920. If the wakeword detection component 920 detects a wakeword in the audio data 911, the wakeword detection component 920 may send an indication of such detection to the hybrid selector 1024. In response to receiving the indication, the hybrid selector 1024 may send the audio data 911 to the system component(s) 120 and/or the ASR component 1050. The wakeword detection component 920 may also send an indication, to the hybrid selector 1024, representing a wakeword was not detected. In response to receiving such an indication, the hybrid selector 1024 may refrain from sending the audio data 911 to the system component(s) 120, and may prevent the ASR component 1050 from further processing the audio data 911. In this situation, the audio data 911 can be discarded.

The user device 110 may conduct its own speech processing using on-device language processing components, such as an SLU/language processing component 1092 (which may include an ASR component 1050 and an NLU component 1060), similar to the manner discussed herein with respect to the language processing component 992 (or ASR component 950 and the NLU component 960) of the system component(s) 120. Language processing component 1092 may operate similarly to language processing component 992, ASR component 1050 may operate similarly to ASR component 950 and NLU component 1060 may operate similarly to NLU component 960. The user device 110 may also internally include, or otherwise have access to, other components such as one or more skill components 1090 capable of executing commands based on NLU output data or other results determined by the user device 110/system component(s) 120 (which may operate similarly to skill components 157), a user recognition component 1095 (configured to process in a similar manner to that discussed herein with respect to the user recognition component 995 of the system component(s) 120), profile storage 1070 (configured to store similar profile data to that discussed herein with respect to the profile storage 970 of the system component(s) 120), or other components. In at least some embodiments, the profile storage 1070 may only store profile data for a user or group of users specifically associated with the user device 110. Similar to as described above with respect to skill component 157, a skill component 1090 may communicate with a skill system component(s) 125. The user device 110 may also have its own language output component 1093 which may include NLG component 1079 and TTS component 1080. Language output component 1093 may operate similarly to language output component 993, NLG component 1079 may operate similarly to NLG component 979 and TTS component 1080 may operate similarly to TTS component 980.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 1024, of the user device 110, may include a hybrid proxy (HP) 1026 configured to proxy traffic to/from the system component(s) 120. For example, the HP 1026 may be configured to send messages to/from a hybrid execution controller (HEC) 1027 of the hybrid selector 1024. For example, command/directive data received from the system component(s) 120 can be sent to the HEC 1027 using the HP 1026. The HP 1026 may also be configured to allow the audio data 911 to pass to the system component(s) 120 while also receiving (e.g., intercepting) this audio data 911 and sending the audio data 911 to the HEC 1027.

In at least some embodiments, the hybrid selector 1024 may further include a local request orchestrator (LRO) 1028 configured to notify the ASR component 1050 about the availability of new audio data 911 that represents user speech, and to otherwise initiate the operations of local language processing when new audio data 911 becomes available. In general, the hybrid selector 1024 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 911 is received, the HP 1026 may allow the audio data 911 to pass through to the system component(s) 120 and the HP 1026 may also input the audio data 911 to the on-device ASR component 1050 by routing the audio data 911 through the HEC 1027 of the hybrid selector 1024, whereby the LRO 1028 notifies the ASR component 1050 of the audio data 911. At this point, the hybrid selector 1024 may wait for response data from either or both of the system component(s) 120 or the local language processing components. However, the disclosure is not limited thereto, and in some examples the hybrid selector 1024 may send the audio data 911 only to the local ASR component 1050 without departing from the disclosure. For example, the user device 110 may process the audio data 911 locally without sending the audio data 911 to the system component(s) 120.

The local ASR component 1050 is configured to receive the audio data 911 from the hybrid selector 1024, and to recognize speech in the audio data 911, and the local NLU component 1060 is configured to determine a user intent from the recognized speech, and to determine how to act on the user intent by generating NLU output data which may include directive data (e.g., instructing a component to perform an action). Such NLU output data may take a form similar to that as determined by the NLU component 960 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 1060) may be selected as usable to respond to a natural language user input, and local response data may be sent (e.g., local NLU output data, local knowledge base information, internet search results, and/or local directive data) to the hybrid selector 1024, such as a "ReadyToExecute" response. The hybrid selector 1024 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 5.

The user device 110 and/or the system component(s) 120 may associate a unique identifier with each natural language user input. The user device 110 may include the unique identifier when sending the audio data 911 to the system component(s) 120, and the response data from the system component(s) 120 may include the unique identifier to identify which natural language user input the response data corresponds.

In at least some embodiments, the user device 110 may include, or be configured to use, one or more skill components 1090 that may work similarly to the skill component(s) 157 implemented by the system component(s) 120. The skill component(s) 1090 may correspond to one or more domains that are used in order to determine how to act on a spoken input in a particular way, such as by outputting a directive that corresponds to the determined intent, and which can be processed to implement the desired operation. The skill component(s) 1090 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 1090, a skill system component(s) 125, or a combination of a skill component 1090 and a corresponding skill system component(s) 125.

Similar to the manner discussed with regard to FIG. 9, the local user device 110 may be configured to recognize multiple different wakewords and/or perform different categories of tasks depending on the wakeword. Such different wakewords may invoke different processing components of local user device 110 (not illustrated in FIG. 10). For example, detection of the wakeword "Alexa" by the wakeword detection component 920 may result in sending audio data to certain language processing components 1092/skills 1090 for processing while detection of the wakeword "Computer" by the wakeword detector may result in sending audio data different language processing components 1092/skills 1090 for processing.

FIG. 11 is a block diagram conceptually illustrating a user device 110 that may be used with the system. FIG. 12 is a block diagram conceptually illustrating example components of a remote device, such as the natural language command processing system component(s) 120, which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The server/system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the user device 110 may include input/output device interfaces 1102 that connect to a variety of components such as an audio output component such as a speaker 1112, a wired headset or a wireless headset (not illustrated), or other component capable of outputting audio. The user device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 1116 for displaying content. The user device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system component(s) 120, or a skill system component(s) 125 may include their own dedicated processors, memory, and/or storage. Alternatively, one or more of the components of the device(s) 110, the natural language command processing system component(s) 120, or a skill system component(s) 125 may utilize the I/O interfaces (1102/1202), processor(s) (1104/1204), memory (1106/1206), and/or storage (1108/1208) of the device(s) 110, natural language command processing system component(s) 120, or the skill system component(s) 125, respectively. Thus, the ASR component 950 may have its own I/O interface(s), processor(s), memory, and/or storage; the NLU component 960 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and a skill system component(s) 125, as described herein, are illustrative, and may be located as a stand-alone device or may be included, in whole or in part, as a component of a larger device or system. As can be appreciated, a number of components may exist either on a system component(s) 120 and/or on user device 110. For example, language processing 992/1092 (which may include ASR 950/1050), language output 993/1093 (which may include NLG 979/1079 and TTS 980/1080), etc., for example as illustrated in FIGS. 9 and 10. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
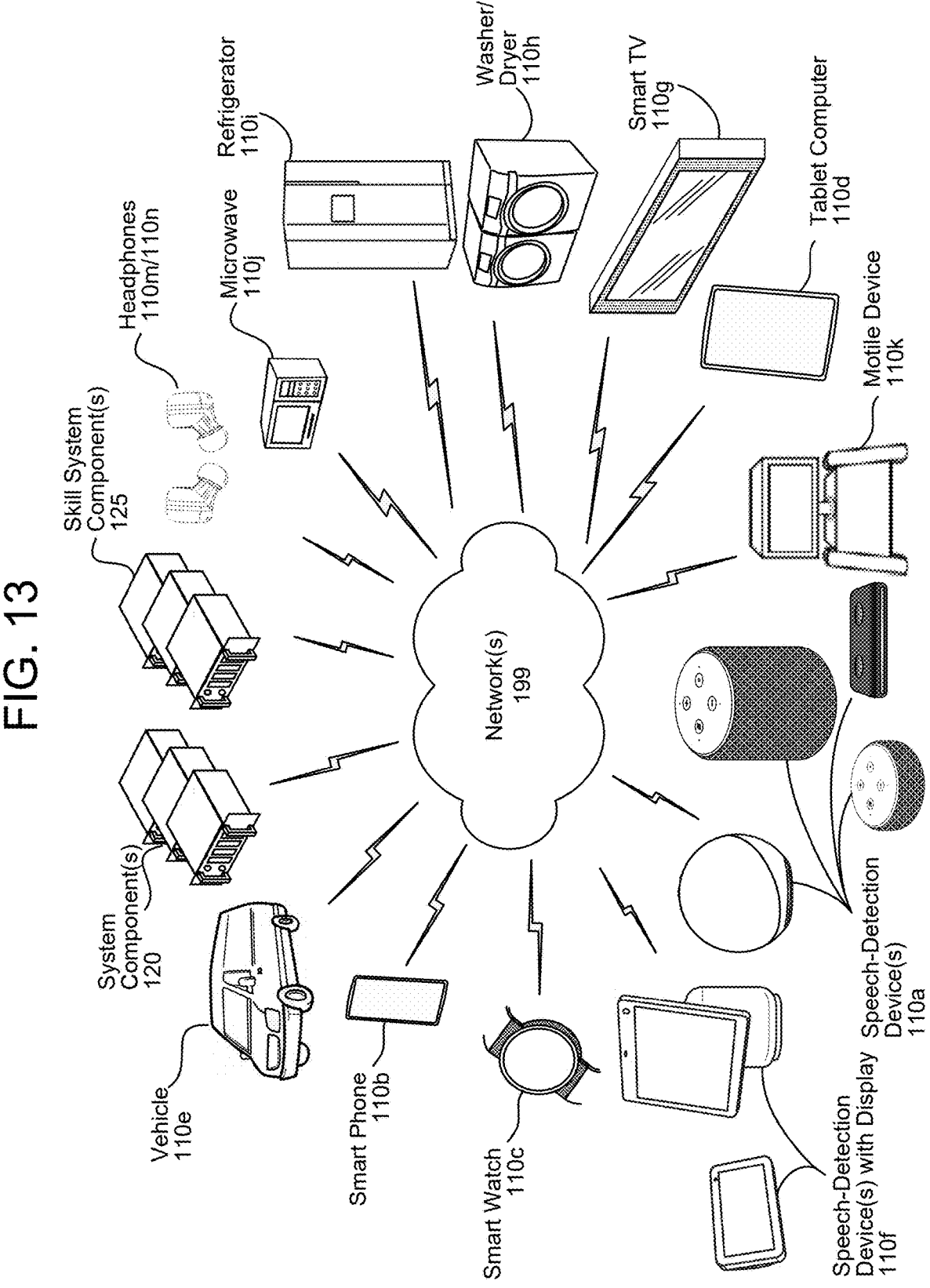
FIG. 13 illustrates an example of a computer network for use with the overall system, according to embodiments of the present disclosure.

As illustrated in FIG. 13, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 950, the NLU component 960, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, by a device, input audio data corresponding to a first spoken user input of a dialog;

performing automatic speech recognition (ASR) processing using the input audio data to generate first ASR output data including a transcript of the first spoken user input;
performing natural language understanding (NLU) processing using the first ASR output data to generate NLU output data including an intent corresponding to the first spoken user input;
generating, using the NLU output data, first output data responsive to the first spoken user input;
causing the device to present the first output data;
performing named entity recognition (NER) processing to determine at least a first entity represented in at least one of the first ASR output data and the first output data;
identifying a first plurality of natural language prompts associated with the first entity, the first plurality of natural language prompts including a first natural language prompt, a second natural language prompt, and a third natural language prompt;
determining dialog history data including second ASR output data including a previous transcript of a previous spoken user input of the dialog;
processing the first plurality of natural language prompts, the first ASR output data, the first output data, and the dialog history data to determine that output of the first natural language prompt will likely result in an unsatisfactory user experience;
based on determining that output of the first natural language prompt will likely result in the unsatisfactory user experience, determining a second plurality of natural language prompts including the second natural language prompt and the third natural language prompt without including the first natural language prompt;
using a trained machine learning (ML) component, processing the second plurality of natural language prompts, the first ASR output data, the first output data, and the dialog history data to determine:
a first likelihood that output of the second natural language prompt will result in receipt of a first subsequent user input associated with the second natural language prompt, and
a second likelihood that output of the third natural language prompt will result in receipt of a second subsequent user input associated with the third natural language prompt;
based on the first likelihood and the second likelihood, generating second output data corresponding to the second natural language prompt instead of the third natural language prompt; and
causing the device to present the second output data.
2. The computer-implemented method of claim 1, further comprising:
using a second trained ML component configured to determine whether a current turn of the dialog is appropriate for output of a natural language prompt, processing the first ASR output data, the first output data, and the first entity to determine the first spoken user input corresponds to a category;
determining that the category indicates that the current turn of the dialog is appropriate for output of a natural language prompt; and
based on the category, identifying the first plurality of natural language prompts associated with the first entity.

3. The computer-implemented method of claim 1, wherein determining that output of the first natural language prompt will likely result in the unsatisfactory user experience comprises:

processing, using a second trained ML component, the first plurality of natural language prompts, the first ASR output data, the first output data, and the dialog history data to determine a first score associated with the first natural language prompt;

determining that the first score fails to satisfy a condition;

based on the first score failing to satisfy the condition, determining that output of the first natural language prompt will likely result in the unsatisfactory user experience; and the computer-implemented method further comprises:

processing, using the second trained ML component, the second natural language prompt, the first ASR output data, the first output data, and the dialog history data to determine a second score associated with the second natural language prompt;

determining that the second score satisfies the condition;

based on the second score satisfying the condition, determining that output of the second natural language prompt will likely result in the receipt of the first subsequent user input requesting information related to the second natural language prompt;

processing, using the second trained ML component, the third natural language prompt, the first ASR output data, the first output data, and the dialog history data to determine a third score associated with the third natural language prompt;

determining that the third score satisfies the condition; and based on determining that the second score and the third score satisfy the condition, determining which of the second natural language prompt and the third natural language prompt is to be output.

4. The computer-implemented method of claim 1, further comprising:

determining first natural language data;

generating, using the first natural language data, a fourth natural language prompt;

determining second natural language data;

generating, using the second natural language data, a fifth natural language prompt;

determining a cluster of natural language prompts including the fourth natural language prompt and the fifth natural language prompt, wherein the cluster of natural language prompts represents that the fourth natural language prompt is semantically associated with the fifth natural language prompt; and based on the fourth natural language prompt and the fifth natural language prompt being included in the cluster of natural language prompts, determining the first plurality of natural language prompts to include one of the fourth natural language prompt and the fifth natural language prompt.

5. A computer-implemented method comprising:

receiving first natural language input data corresponding to a first natural language user input;

determining first output data responsive to the first natural language user input;

determining at least a first entity represented in at least one of the first natural language input data and the first output data;

identifying a first plurality of natural language output data associated with the first entity, the first plurality of natural language output data including first natural language output data and second natural language output data;

determining history data including second natural language input data corresponding to a previous user input;

processing the first plurality of natural language output data, the first natural language input data, the first output data, and the history data to determine that output of the first natural language output data will likely result in an unsatisfactory user experience;

based on determining that output of the first natural language output data will likely result in the unsatisfactory user experience, determining a second plurality of natural language output data including the second natural language output data without including the first natural language output data;

using a trained machine learning (ML) component, processing the second plurality of natural language output data, the first natural language input data, the first output data, and the history data to determine that output of the second natural language output data will likely result in a satisfactory user experience; and causing the second natural language output data to be presented.

6. The computer-implemented method of claim 5, wherein the first natural language input data is received as part of a dialog, and the method further comprises:

using a second trained ML component configured to determine whether a current turn of the dialog is appropriate for output of natural language output data, processing the first natural language input data, the first output data, and the first entity to determine the first natural language user input corresponds to a category;

determining that the category indicates that the current turn of the dialog is appropriate for output of natural language output data; and based on the category, identifying the first plurality of natural language output data.

7. The computer-implemented method of claim 5, further comprising:

processing, using a second trained ML component, the first natural language output data, the first natural language input data, the first output data, and the history data to determine that the first natural language output data corresponds to a rephrasing of at least one of the first natural language input data, the first output data, and the history data; and determining that output of the first natural language output data will likely result in the unsatisfactory user experience based on determining that the first natural language output data corresponds to the rephrasing.

8. The computer-implemented method of claim 5, further comprising:

determining third natural language input data;

generating, using the third natural language input data, third natural language output data;

determining fourth natural language input data;

generating, using the fourth natural language input data, fourth natural language output data;

determining a cluster of natural language output data including the third natural language output data and the fourth natural language output data, wherein the cluster of natural language output data represents that the third natural language output data is semantically associated with the fourth natural language output data; and based on the third natural language output data and the fourth natural language output data being included in the cluster of natural language output data, determining the first plurality of natural language output data to include one of the third natural language output data and the fourth natural language output data.

9. The computer-implemented method of claim 5, further comprising:

determining third natural language input data corresponding to a second natural language user input;

determining the second natural language user input has been received with at least a threshold frequency; and based on the second natural language user input being received with at least the threshold frequency, generating third natural language output data corresponding to the second natural language user input.

10. The computer-implemented method of claim 5, wherein determining the second natural language output data will likely result in the satisfactory user experience is determined using a second trained ML component, and the method further comprises:

determining second history data including third natural language input data corresponding to a second previous user input;

determining third output data corresponding to third natural language output data;

determining fourth output data corresponding to fourth natural language output data;

determining the second previous user input corresponds to the third output data;

determining the fourth output data is unassociated with the second history data; and generating an updated trained ML component based on the second trained ML component, the second previous user input corresponding to the third output data and the fourth output data being unassociated with the second history data.

11. The computer-implemented method of claim 5, further comprising:

identifying third natural language output data associated with the first entity; and determining the third natural language output data is semantically equivalent to the first natural language input data, wherein the trained ML component does not process with respect to the third natural language output data based on determining that the third natural language output data is semantically equivalent to the first natural language input data.

12. The computer-implemented method of claim 5, further comprising:

identifying third natural language output data associated with the first entity; and determining that the third natural language output data includes a second entity different from the first entity, the second entity being unassociated with the first natural language input data, wherein the trained ML component does not process with respect to the third natural language output data based on the third natural language output data including the second entity different from the first entity and the second entity being unassociated with the first natural language input data.

13. A computing system comprising:

at least one processor; and at least one memory comprising instructions that, when executed by the at least one processor, cause the computing system to:

receive first natural language input data corresponding to a first natural language user input;

determine first output data responsive to the first natural language user input;

determine at least a first entity represented in at least one of the first natural language input data and the first output data;

identify a first plurality of natural language output data associated with the first entity, the first plurality of natural language output data including first natural language output data and second natural language output data;

determine history data including second natural language input data corresponding to a previous user input;

process the first plurality of natural language output data, the first natural language input data, the first output data, and the history data to determine that output of the first natural language output data will likely result in an unsatisfactory user experience;

based on determining that output of the first natural language output data will likely result in the unsatisfactory user experience, determine a second plurality of natural language output data including the second natural language output data without including the first natural language output data;

using a trained machine learning (ML) component, process the second plurality of natural language output data, the first natural language input data, the first output data, and the history data to determine that output of the second natural language output data will likely result in a satisfactory user experience; and cause the second natural language output data to be presented.

14. The computing system of claim 13, wherein the first natural language input data is received as part of a dialog, and wherein the at least one memory further comprises instructions that, when executed by the at least one processor, further cause the computing system to:

use a second trained ML component configured to determine whether a current turn of the dialog is appropriate for output of natural language output data, process the first natural language input data, the first output data, and the first entity to determine the first natural language user input corresponds to a category;

determine that the category indicates that the current turn of the dialog is appropriate for output of natural language output data; and based on the category, identify the first plurality of natural language output data.

15. The computing system of claim 13, wherein the at least one memory further comprises instructions that, when executed by the at least one processor, further cause the computing system to:

process, using a second trained ML component, the first natural language output data, the first natural language input data, the first output data, and the history data to determine that the first natural language output data corresponds to a rephrasing of at least one of the first natural language input data, the first output data, and the history data; and determine that output of the first natural language output data will likely result in the unsatisfactory user experience based on determining that the first natural language output data corresponds to the rephrasing.

16. The computing system of claim 13, wherein the at least one memory further comprises instructions that, when executed by the at least one processor, further cause the computing system to:

determine third natural language input data;

generate, using the third natural language input data, third natural language output data;

determine fourth natural language input data;

generate, using the fourth natural language input data, a fourth natural language output data;

determine a cluster of natural language output data including the third natural language output data and the fourth natural language output data, wherein the cluster of natural language output data represents that the third natural language output data is semantically associated with the fourth natural language output data; and based on the third natural language output data and the fourth natural language output data being included in the cluster of natural language output data, determine the first plurality of natural language output data to include one of the third natural language output data and the fourth natural language output data.

17. The computing system of claim 13, wherein the at least one memory further comprises instructions that, when executed by the at least one processor, further cause the computing system to:

determine third natural language input data corresponding to a second natural language user input;

determine the second natural language user input has been received with at least a threshold frequency; and based on the second natural language user input being received with at least the threshold frequency, generate third natural language output data corresponding to the second natural language user input.

18. The computing system of claim 13, wherein determining the second natural language output data will likely result in the satisfactory user experience is determined using a second trained ML component, and wherein the at least one memory further comprises instructions that, when executed by the at least one processor, further cause the computing system to:

determine second history data including third natural language input data corresponding to a second previous user input;

determine third output data corresponding to third natural language output data;

determine fourth output data corresponding to fourth natural language output data;

determine the second previous user input corresponds to the third output data;

determine the fourth output data is unassociated with the second history data; and generate an updated trained ML component based on the second trained ML component, the second previous user input corresponding to the third output data and the fourth output data being unassociated with the second history data.

19. The computing system of claim 13, wherein the at least one memory further comprises instructions that, when executed by the at least one processor, further cause the computing system to:

identify third natural language output data associated with the first entity; and determine the third natural language output data is semantically equivalent to the first natural language input data, wherein the trained ML component does not process with respect to the third natural language output data based on determining that the third natural language output data is semantically equivalent to the first natural language input data.

* * * * *